United States Patent
Melville et al.

(10) Patent No.: US 12,360,360 B2
(45) Date of Patent: Jul. 15, 2025

(54) SYSTEM FOR USING CHARACTERIZATION LIGHT TO DETECT FIBER POSITION IN A FIBER SCANNING PROJECTOR

(71) Applicant: Magic Leap, Inc., Plantation, FL (US)

(72) Inventors: Charles David Melville, Camano Island, WA (US); Abhijith Rajiv, Seattle, WA (US); Benjamin John Kuehn, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 435 days.

(21) Appl. No.: 17/090,600

(22) Filed: Nov. 5, 2020

(65) Prior Publication Data

US 2021/0132371 A1    May 6, 2021

Related U.S. Application Data

(60) Provisional application No. 63/010,119, filed on Apr. 15, 2020, provisional application No. 62/931,586, filed on Nov. 6, 2019.

(51) Int. Cl.
| | |
|---|---|
| *G02B 26/10* | (2006.01) |
| *G02B 26/08* | (2006.01) |
| *H04N 9/31* | (2006.01) |

(52) U.S. Cl.
CPC ....... *G02B 26/101* (2013.01); *G02B 26/0841* (2013.01); *G02B 26/0858* (2013.01); *H04N 9/3155* (2013.01); *H04N 9/3167* (2013.01)

(58) Field of Classification Search
CPC .............. G02B 26/101; G02B 26/0841; G02B 26/0858; G02B 26/10; G02B 26/085;

(Continued)

(56) References Cited

U.S. PATENT DOCUMENTS

| | | |
|---|---|---|
| 5,727,098 A | 3/1998 | Jacobson |
| 12,174,318 B2 | 12/2024 | Melville et al. |

(Continued)

FOREIGN PATENT DOCUMENTS

| | | | | |
|---|---|---|---|---|
| CN | 108844718 A | * | 11/2018 | ............ G01M 11/31 |
| CN | 112444965 A | | 3/2021 | |
| WO | WO-2017096697 A1 | * | 6/2017 | ............. G02B 6/036 |

OTHER PUBLICATIONS

U.S. Appl. No. 17/104,650, "Non-Final Office Action", Jan. 2, 2024, 9 pages.

(Continued)

*Primary Examiner* — Marin Pichler
*Assistant Examiner* — Justin W. Hustoft
(74) *Attorney, Agent, or Firm* — KILPATRICK TOWNSEND & STOCKTON LLP

(57) ABSTRACT

A projector including a cantilever position detection system includes a chassis and an actuator mounted to the chassis. The projector also includes a cantilever light source having a longitudinal axis and mechanically coupled to the actuator. The cantilever light source is operable to transmit display light and characterization light. The projector further includes an optical assembly section operable to receive the display light and the characterization light. The optical assembly section includes a dichroic mirror operable to reflect at least a portion of the display light and transmit at least a portion of the characterization light. Moreover, the projector includes a position measurement device operable to receive the transmitted portion of the characterization light.

20 Claims, 19 Drawing Sheets

(58) Field of Classification Search
CPC .. G02B 6/00; G02B 6/122; G02B 2027/0144; H04N 9/3155; H04N 9/3167
See application file for complete search history.

(56) References Cited

U.S. PATENT DOCUMENTS

| | | | |
|---|---|---|---|
| 2008/0265178 A1* | 10/2008 | Johnston | A61B 1/00006 250/492.1 |
| 2009/0235396 A1 | 9/2009 | Wang et al. | |
| 2011/0061452 A1* | 3/2011 | King | G01Q 60/32 73/105 |
| 2011/0317967 A1* | 12/2011 | Kumkar | G02B 6/2558 385/98 |
| 2014/0231647 A1 | 8/2014 | Chinn et al. | |
| 2015/0016777 A1* | 1/2015 | Abovitz | G02B 27/0093 385/37 |
| 2015/0235441 A1* | 8/2015 | Abovitz | G16H 40/20 345/633 |
| 2016/0285227 A1* | 9/2016 | Farrow | H01S 3/0675 |
| 2017/0199384 A1* | 7/2017 | Yeoh | G06T 15/50 |
| 2018/0275396 A1 | 9/2018 | Schowengerdt et al. | |
| 2018/0278924 A1* | 9/2018 | Schowengerdt | G02B 27/0172 |
| 2018/0288404 A1* | 10/2018 | Ikehara | H04N 13/243 |
| 2021/0156967 A1 | 5/2021 | Melville et al. | |

OTHER PUBLICATIONS

Grober et al., "Design and implementation of a low temperature near-field scanning optical microscope", Review of Scientific Instruments, vol. 65 issue 3, Mar. 1, 1994, pp. 626-631.
U.S. Appl. No. 17/104,650, "Final Office Action", Jun. 18, 2024, 10 pages.

* cited by examiner

SYSTEM FOR USING CHARACTERIZATION LIGHT TO DETECT FIBER POSITION IN A FIBER SCANNING PROJECTOR

CROSS-REFERENCES TO RELATED APPLICATIONS

This application claims priority to U.S. Provisional Patent Application No. 62/931,586, filed on Nov. 6, 2019, entitled "METHOD AND SYSTEM FOR USING CHARACTERIZATION LIGHT TO DETECT FIBER POSITION IN A FIBER SCANNING PROJECTOR," and U.S. Provisional Patent Application No. 63/010,119, filed on Apr. 15, 2020, entitled "METHOD AND SYSTEM FOR USING CHARACTERIZATION LIGHT TO DETECT FIBER POSITION IN A FIBER SCANNING PROJECTOR," the disclosures of which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to projection display systems including wearable displays. More particularly, embodiments of the present invention provide methods and systems for determining the location at which light is projected from a scanning cantilever as a function of time. As described more fully herein, by measuring the position at which light projected from the scanning cantilever impinges on a sensor as a function of time, methods described herein are able to correlate the measured position with an image viewed by a user. In some implementations, the measured position is correlated with a position of the tip of the scanning cantilever as a function of time. As described herein, the scanning cantilever supports the propagation of display light, which is utilized in generating virtual content, as well as characterization light, which is utilized in determining the position of the scanning cantilever. In a particular embodiment, the scanning cantilever can be a scanning fiber and a dichroic mirror, which can be a collimating mirror, and can be utilized in conjunction with a quadrant detector to detect the location at which display light is projected by the scanning fiber. The invention is applicable to a variety of applications in computer vision and image display systems.

As described more fully herein, embodiments of the present invention enable the detection of the location of projected light in space and time. In an embodiment, light in an additional wavelength band (e.g., infrared light) is added to the visible light, also referred to as display light or an optical signal, which is utilized to create virtual content through the imaging system. The detection of the additional wavelength band at one or more detectors, for example, a quadrant detector, is then used to determine scanning optical waveguide position. Thus, the position of the tip of a scanning fiber can be measured as a function of time. In another embodiment, a single element photodiode is utilized in conjunction with a transmission mask to measure the position of the tip of a scanning fiber as a function of time. Although the description herein generally relates to the use of fiber scanners as the resonant cantilever, embodiments of the present invention are not limited to fiber scanners and other resonant cantilevers, including microelectromechanical system (MEMS)-based resonators that are included within the scope of the present invention.

According to an embodiment of the present invention, a projector including a cantilever position detection system is provided. The projector includes a chassis, an actuator mounted to the chassis, and a cantilever light source having a longitudinal axis and mechanically coupled to the actuator. The cantilever light source is operable to transmit display light and characterization light. The projector also includes an optical assembly section operable to receive the display light and the characterization light. The optical assembly section includes a dichroic mirror operable to reflect at least a portion of the display light and transmit at least a portion of the characterization light. The projector further includes a position measurement device operable to receive the transmitted portion of the characterization light.

According to another embodiment of the present invention, a projector including a cantilever position detection system is provided. The projector includes a chassis, an actuator mounted to the chassis, and a position measurement device mounted to the chassis and including an aperture. The projector further includes a cantilever light source having a longitudinal axis and mechanically coupled to the actuator. The cantilever light source is operable to transmit display light and characterization light and the cantilever light source passes through the aperture. The projector further includes an optical assembly section operable to receive the display light and the characterization light. The optical assembly section includes a dichroic polarizing beam splitter operable to transmit at least a portion of the characterization light independent of a polarization state of the characterization light.

According to a specific embodiment of the present invention, a projector including a cantilever position detection system is provided. The projector includes a chassis having a support side and an emission side, an actuator mounted to the chassis, and a cantilever light source having a longitudinal axis and mechanically coupled to the actuator, wherein the cantilever light source is operable to transmit display light and characterization light. The projector further includes an optical assembly section operable to receive the display light and the characterization light. The optical assembly section includes a dichroic polarizing beam splitter operable to reflect at least a portion of the characterization light toward the support side. The projector also includes an optical sensor coupled to the support side.

According to another specific embodiment of the present invention, a method of measuring a position of a scanning cantilever is provided. The method includes emitting display light and characterization light from a cantilever light source and coupling the display light and the characterization light into an optical assembly section having a dichroic mirror. The method also includes reflecting, at the dichroic mirror, at least a portion of the display light and transmitting, at the dichroic mirror, at least a portion of the characterization light. The method further includes receiving the transmitted portion of the characterization light at a position measurement device.

According to a particular embodiment of the present invention, a method of measuring a position of a scanning cantilever is provided. The method includes emitting display light and characterization light from a cantilever light source and coupling the display light and the characterization light into an optical assembly section having a dichroic polarizing beam splitter. The method also includes transmitting, at the dichroic polarizing beam splitter, a transmitted portion of the display light and a transmitted portion of the characterization light and collimating the transmitted portion of the display light and the transmitted portion of the characterization light. The method further includes reflecting, at the dichroic polarizing beam splitter, at least a portion of the collimated display light, transmitting, at the dichroic polarizing beam splitter, at least a portion of the collimated characterization light, and receiving the transmitted portion of the collimated characterization light at a position measurement device.

According to another particular embodiment of the present invention, a method of measuring a position of a scanning cantilever is provided. The method includes providing a projector including a chassis having a support side and an emission side and a cantilever light source mounted in the chassis. The method also includes emitting display light and characterization light from the cantilever light source and coupling the display light and the characterization light into an optical assembly section having a dichroic polarizing beam splitter. The method further includes reflecting, at the dichroic polarizing beam splitter, at least a portion of the characterization light toward the support side and directing the reflected portion of the characterization light toward an optical sensor.

According to an embodiment, a projector including a cantilever position detection system is provided. The projector includes a chassis having a support side and an emission side, an actuator mounted to the chassis, and a cantilever light source having a longitudinal axis and mechanically coupled to the actuator. The cantilever light source is operable to transmit display light and characterization light and can include a scanning light source, for example, a scanning waveguide source implemented as a MEMS element including a cantilevered waveguide. The actuator can include a piezoelectric actuator and the cantilever light source can include a scanning fiber mechanically coupled to the piezoelectric actuator and defining a convex object surface. In this embodiment, the scanning fiber can include a first fiber and a second fiber joined at a bonding region. The first fiber has a first cladding diameter and the second fiber has a second cladding diameter greater than the first cladding diameter. The projector can also include one or more light sources operable to emit the characterization light to impinge on the bonding region. A portion of the characterization light can be coupled into and propagate in a cladding of the second fiber.

The projector also includes an optical assembly section operable to receive the display light and the characterization light. The optical assembly section comprises a dichroic polarizing beam splitter operable to reflect at least a portion of the characterization light toward the support side. The projector further includes an optical sensor coupled to the support side. The optical sensor can include a camera having a two-dimensional pixel array, a position sensing diode, or a single element photodiode. If a single element photodiode is used, the projector can include a transmission mask operable to receive the reflected portion of the characterization light and transmit filtered characterization light to the single element photodiode. The transmission mask can be disposed between the optical assembly section and the single element photodiode. The display light can include visible wavelengths and the characterization light can include infrared wavelengths.

According to another embodiment of the present invention, a method of measuring a position of a scanning cantilever is provided. The method includes emitting display light and characterization light from a cantilever light source, for example, a scanning fiber, coupling the display light and the characterization light into an optical assembly section having a dichroic mirror, and reflecting, at the dichroic mirror, at least a portion of the display light. The method also includes transmitting, at the dichroic mirror, at least a portion of the characterization light and receiving the transmitted portion of the characterization light at a position measurement device, for example, a quadrant detector. In embodiments using a scanning fiber, the scanning fiber can include a first fiber and a second fiber joined at a bonding region. The first fiber has a first cladding diameter and the second fiber has a second cladding diameter greater than the first cladding diameter. In this embodiment, the method can include injecting the characterization light into a cladding of the second fiber at the bonding region. The scanning fiber can be characterized by a longitudinal axis and the quadrant detector can be disposed in a lateral plane orthogonal to the longitudinal axis. The scanning fiber can include a reflective coating.

The method can include focusing at least a portion of the characterization light using characterization optics disposed between the dichroic mirror and the position measurement device. The display light can include visible wavelengths and the characterization light can include infrared wavelengths.

According to yet another embodiment of the present invention, a method of measuring a position of a scanning cantilever is provided. The method includes emitting display light and characterization light from a cantilever light source, and coupling the display light and the characterization light into an optical assembly section having a dichroic polarizing beam splitter. The method also includes transmitting, at the dichroic polarizing beam splitter, a transmitted portion of the display light and a transmitted portion of the characterization light and collimating the transmitted portion of the display light and the transmitted portion of the characterization light. The method further includes reflecting, at the dichroic polarizing beam splitter, at least a portion of the collimated display light, transmitting, at the dichroic polarizing beam splitter, at least a portion of the collimated characterization light, and receiving the transmitted portion of the collimated characterization light at a position measurement device. The position measurement device can include a quadrant detector or an aperture with the cantilever light source passing through the aperture. The cantilever light source can be a scanning fiber. The scanning fiber can include a first fiber and a second fiber joined at a bonding region. The first fiber has a first cladding diameter and the second fiber has a second cladding diameter greater than the first cladding diameter. In this embodiment, the method further includes injecting the characterization light into a cladding of the second fiber at the bonding region. The scanning fiber can be characterized by a longitudinal axis and the quadrant detector can be disposed in a lateral plane orthogonal to the longitudinal axis. The scanning fiber can include a reflective coating. The display light can include visible wavelengths and the characterization light can include infrared wavelengths.

According to a particular embodiment of the present invention, a method of measuring a position of a scanning cantilever is provided. The method includes providing a projector including a chassis having a support side and an emission side with a cantilever light source mounted in the chassis. The cantilever light source can include a scanning fiber including a first fiber and a second fiber joined at a bonding region. The first fiber has a first cladding diameter and the second fiber has a second cladding diameter greater than the first cladding diameter. In this case, the method can include injecting the characterization light into a cladding of the second fiber at the bonding region. The method can also include coupling into and propagating a portion of the characterization light in a cladding of the second fiber. The cantilever light source can include a MEMS element including a cantilevered waveguide.

The method also includes emitting display light and characterization light from the cantilever light source, coupling the display light and the characterization light into an optical assembly section having a dichroic polarizing beam splitter, reflecting, at the dichroic polarizing beam splitter, at least a portion of the characterization light toward the support side, and directing the reflected portion of the characterization light toward an optical sensor.

The optical sensor can include a camera having a two-dimensional pixel array, a position sensing diode, or a single element photodiode. When a single element photodiode is used, the method can include filtering the reflected portion of the characterization light through a transmission mask and directing the filtered characterization light to the single element photodiode. The transmission mask can be disposed between the optical assembly section and the single element photodiode. The display light can include visible wavelengths and the characterization light can include infrared wavelengths.

According to another particular embodiment of the present invention, a projector including a cantilever position detection system is provided. The projector includes a chassis and an actuator mounted to the chassis. The projector also includes a cantilever light source having a longitudinal axis and mechanically coupled to the actuator. The cantilever light source is operable to transmit light. The projector further includes an optical assembly section operable to receive the light. The optical assembly section includes a polarizing beamsplitter having an incidence surface and an opposing surface and is operable to transmit light incident on the incidence surface and reflect at least a portion of light incident on the opposing surface. The projector also includes a position measurement device, for example, a position sensitive device (PSD) optically coupled to the optical waveguide and optionally including either a two-dimensional array sensor or a plurality of one-dimensional sensors, operable to receive the reflected portion of the light and an optical waveguide disposed between the optical assembly section and the position measurement device, operable to transmit at least a second portion of the light. The optical waveguide can include an eyepiece waveguide including an incoupling diffractive optical element. The light can include at least one of display light or characterization light.

The optical waveguide can include an output surface having a segmented reflector disposed thereon. The segmented reflector is interposed between the optical waveguide and the position measurement device and includes a reflective portion oriented toward the optical waveguide and a plurality of transmissive portions. The optical waveguide can include a plurality of gratings disposed within the optical waveguide and operable to diffract a portion of the reflected portion of the light into the optical waveguide. The plurality of gratings can include a first grating operable to diffract light having a wavelength from 600-700 nanometers, a second grating operable to diffract light having a wavelength from 485-600 nanometers, and a third grating operable to diffract light having a wavelength from 400-485 nanometers.

According to a specific embodiment of the present invention, a projector including a cantilever light source is provided. The projector includes a chassis, an actuator mounted to the chassis, and a cantilever light source having a longitudinal axis and mechanically coupled to the actuator. The cantilever light source is operable to transmit display light and characterization light.

The projector also includes an optical assembly section operable to receive the display light and the characterization light and a vacuum assembly operable to maintain a cavity comprising the cantilever light source at an operating pressure less than atmospheric pressure. In an embodiment, the chassis includes a groove operable to receive the optical assembly section and the vacuum assembly includes a sealant disposed within the groove for providing a gas tight seal between the chassis and the optical assembly section. The vacuum assembly can include a transparent port fused to the chassis for providing a gas tight seal between the chassis and a surrounding environment. The cavity can include the chassis and the optical assembly section and the vacuum assembly can include a plurality of electrical feedthroughs. In an embodiment, the projector includes an optical waveguide and the vacuum assembly is fused to the optical waveguide, thereby providing a gas tight seal between the vacuum assembly and the optical waveguide.

Numerous benefits are achieved by way of the present invention over conventional techniques. For example, embodiments of the present invention provide methods and systems that provide real time or near real time detection of the position of an optical waveguide integrated with a resonant cantilever in two dimensions in order to provide feedback to the control system that provides the drive signal for the resonant cantilever, as well as the system producing the optical signal present in the waveguide. Importantly, embodiments of the present invention provide highly compact and low cost systems for cantilever position detection that are compatible with compact fiber scanner systems, enabling a form factor comparable to standard eyeglasses. These and other embodiments of the invention, along with many of its advantages and features, are described in more detail in conjunction with the text below and attached figures.

DETAILED DESCRIPTION OF SPECIFIC EMBODIMENTS

The present invention relates generally to methods and systems related to projection display systems including wearable displays. More particularly, embodiments of the present invention provide methods and systems for volumetric displays, also referred to as light field displays, that create volumetric sculptures of light at more than one depth plane. The invention is applicable to a variety of applications in computer vision and image display systems.

Resonant cantilever structures that include optical waveguides are being used to transport and project light, which can be referred to as an optical signal, to produce virtual content for optical displays. These resonant cantilevers can move in many types of scan patterns, including raster, spiral, elliptical, propeller, or the like. In order to operate these scan patterns efficiently, precise knowledge of the waveguide's position at any particular time to a high degree of accuracy is useful in producing an undistorted image. This information related to the temporal position of the resonant cantilever can be used to provide "feedback" to the control system that provides the drive signal for the resonant cantilever, as well as the system producing the optical signal in the waveguide.

Figure 1:
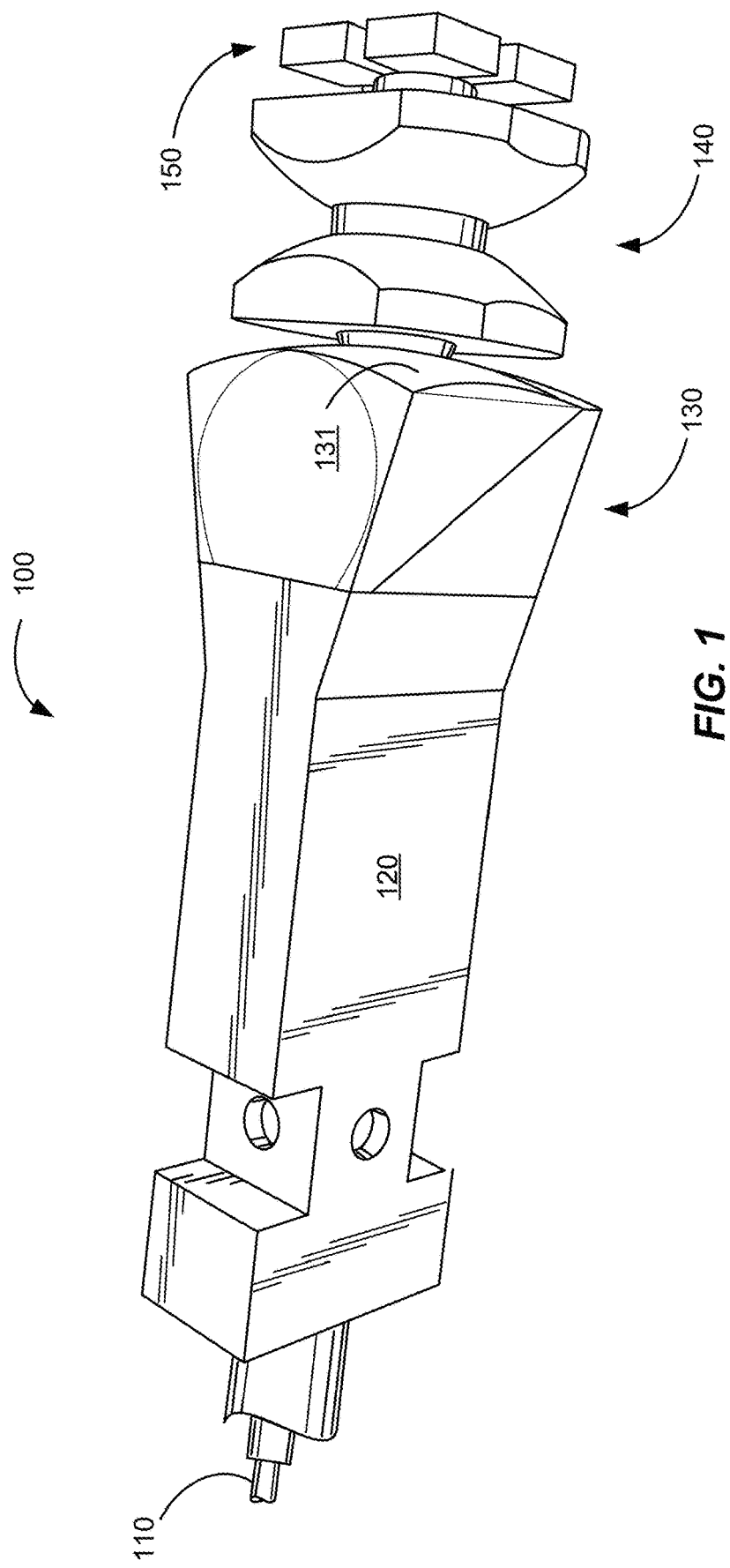
FIG. 1 is a simplified perspective view illustrating a fiber scanning projector according to an embodiment of the present invention.

FIG. 1 is a simplified perspective view illustrating a fiber scanning projector according to an embodiment of the present invention. The fiber scanning projector 100, which can have dimensions on the order of 2 mm×2 mm×7 mm, includes optical fiber 110 that carries an optical signal that can be used to project an image, also referred to as a virtual image. In the embodiment illustrated in FIG. 1, the optical signal includes both display wavelengths, for example red, green, and blue (RGB) wavelengths, as well as characterization wavelengths, for example, infrared (IR) wavelengths of light. As described more fully herein, the display (e.g., RGB) wavelengths are utilized to provide display light that is projected to the user while the characterization (e.g., IR) wavelengths are utilized to measure the position of the scanning fiber as a function of time. Although IR wavelengths are utilized to illustrate characterization wavelengths in this disclosure, the present invention is not limited to the use of IR wavelengths and other characterization wavelengths can be utilized according to embodiments of the present invention.

Driven by piezoelectric actuators (not illustrated in FIG. 1, but described more fully below), optical fiber 110 oscillates, for example, in a spiral configuration with an increasing angular deflection during the projection of light for a given frame time. Input light to fiber scanning projector 100 is provided through optical fiber 110 and output light from fiber scanning projector 100 is provided through one or more of the surfaces of optical assembly section 130. The various elements of the fiber scanning projector are described more fully throughout the present specification.

As illustrated in FIG. 1, fiber scanning projector 100 includes a chassis 120 that is joined to optical assembly section 130. Chassis 120 can also be referred to as a housing. Characterization optics 140 are optically coupled to optical assembly section 130 and a quadrant detector 150 is optically coupled to characterization optics 140. As described more fully herein, light passing through collimating surface 131 of optical assembly section 130 is focused using characterization optics 140 onto quadrant detector 150 in order to measure the position of the scanning fiber. In the embodiments illustrated in FIG. 1, characterization optics 140 are illustrated as a multi-element lens group, although this is not required by the present invention.

Although the description in FIG. 1 relates to the use of fiber scanners as a resonant cantilever, embodiments of the present invention are not limited to fiber scanners and other resonant cantilevers, including microelectromechanical system (MEMS)-based resonators, are included within the scope of the present invention. Accordingly, the description related to fiber scanners and scanning fibers herein is merely exemplary of resonant cantilever structures and the fiber scanners discussed and illustrated herein can be replaced by other types of resonant cantilevers as appropriate. One of ordinary skill in the art would recognize many variations, modifications, and alternatives.

Figure 2:
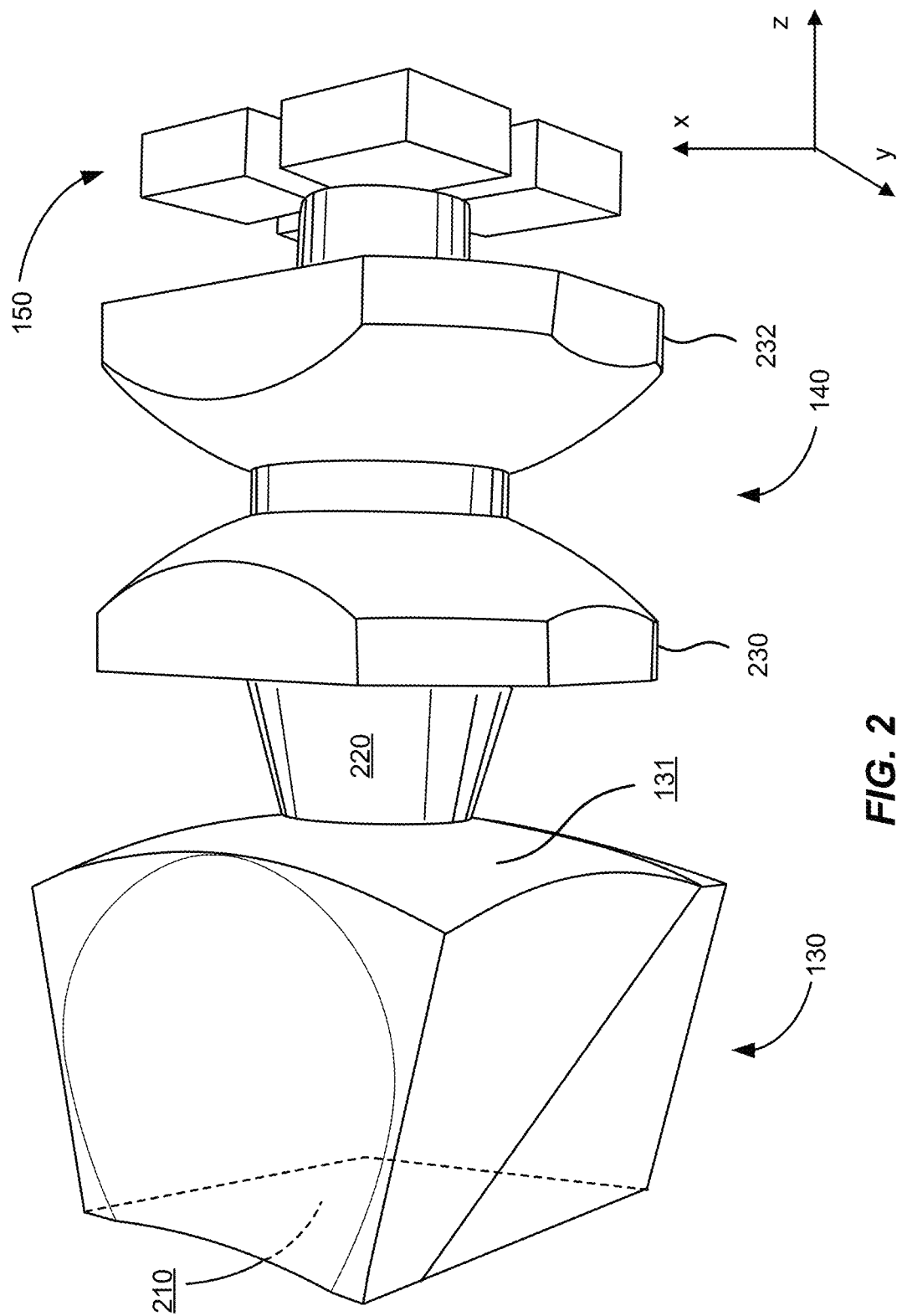
FIG. 2 is a simplified enlarged perspective view of an optical assembly section, characterization optics, and quadrant detector according to an embodiment of the present invention.

FIG. 2 is a simplified enlarged perspective view of an optical assembly section, characterization optics, and quadrant detector according to an embodiment of the present invention. In the enlarged perspective view illustrated in FIG. 2, input surface 210 of optical assembly section 130 is noted although it is hidden from view in this perspective drawing. Collimating surface 131 has a radius of curvature suitable to collimate display wavelengths that are incident on collimating surface 131. According to embodiments of the present invention, collimating surface 131 is substantially reflective at display wavelengths and substantially transmissive at characterization wavelengths, for example, IR wavelengths. Accordingly, collimating surface 131 is referred to as a "cold" mirror since is reflects short (i.e., cool) wavelengths and transmits longer (i.e., warm) wavelengths. Collimating surface 131 can also be referred to as a dichroic mirror or a dichroic collimating surface as a result of this surface having significantly different reflection and transmission properties over these different wavelength ranges.

As illustrated in FIG. 2, characterization wavelengths pass through collimating surface 131 as output beam 220. Characterization optics 140 include a pair of lens elements 230 and 232 in the illustrated embodiment, although other lens designs can be utilized according to an embodiment of the present invention. In FIG. 2, the scanning fiber is positioned at a centered or resting position as illustrated by the beam associated with the characterization wavelengths being centered on the characterization optics 140. Light focused using characterization optics 140 impinges on quadrant detector 150. By measuring the intensity of light incident on each of the four quadrants of the quadrant detector, the position of the light emitted by the scanning fiber, measured in the x-y plane, can be determined. As stated above, when the scanning fiber is positioned at a centered or resting position, the light emitted by the scanning fiber will be centered at the origin of the x-y plane.

Figure 3:
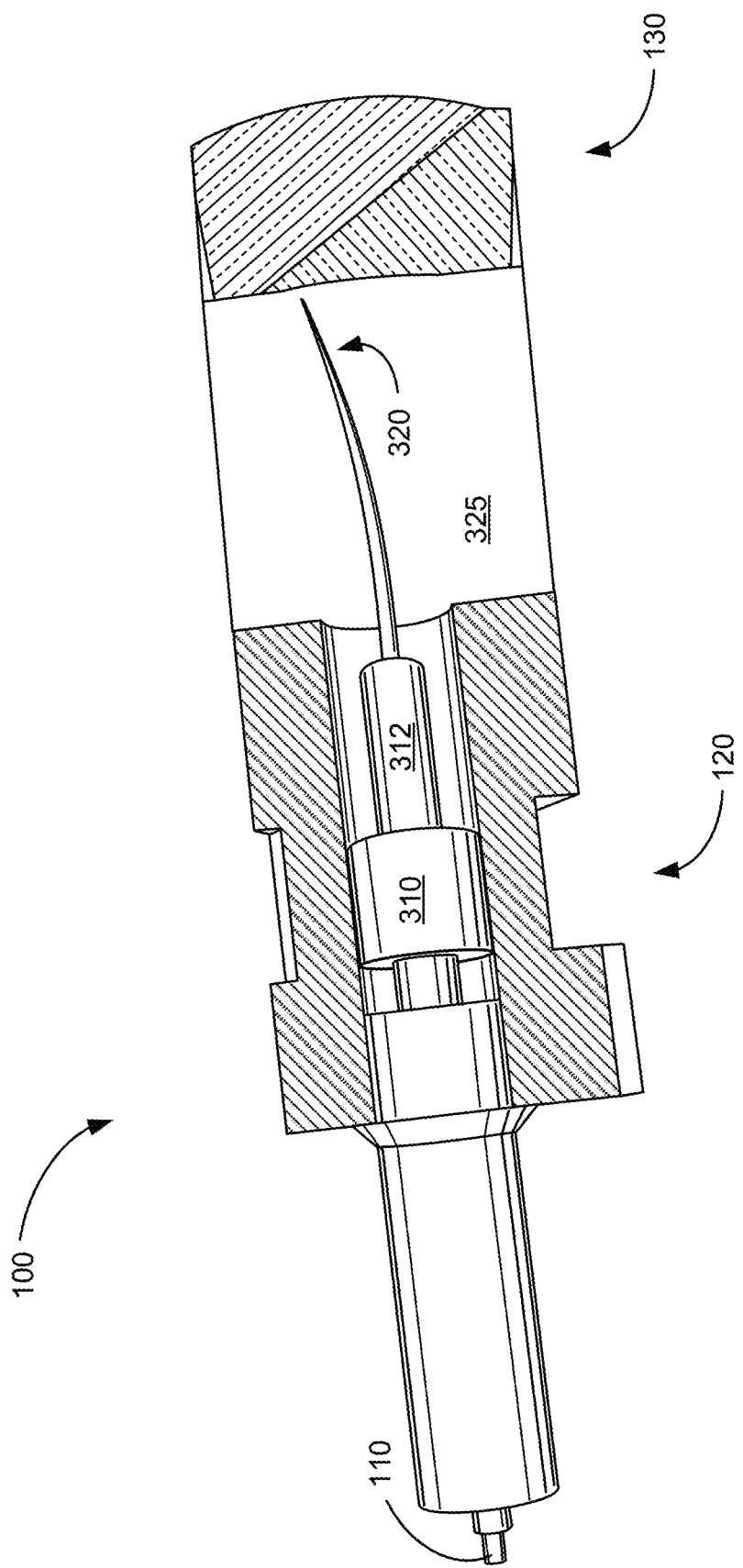
FIG. 3 is a simplified cutaway perspective view illustrating a fiber scanning projector according to an embodiment of the present invention.

FIG. 3 is a simplified cutaway perspective view illustrating a fiber scanning projector according to an embodiment of the present invention. Referring to FIG. 3, elements illustrated in FIG. 1 are also illustrated in FIG. 3 and the description provided in relation to these elements in FIG. 1 is applicable to FIG. 3 as applicable. Optical fiber 110 is illustrated on the left-hand side of the figure, providing an input to the fiber scanning projector. Chassis 120 provides mechanical support for retention collar 310, which, in turn, provides mechanical support for piezoelectric actuator 312, which is driven by electric signals from wires that are not shown. Scanning fiber 320 passes through piezoelectric actuator 312 and is illustrated in a deflected position. After exiting piezoelectric actuator 312, scanning fiber 320 passes into interior region 325 of chassis 120. Optical assembly section 130 is mounted to chassis 120.

As will be evident to one of skill in the art, scanning fiber 320 is operable to oscillate with an increasing angular deflection during a given frame time in order to project light toward optical assembly section 130. Optical assembly section 130 receives light from scanning fiber 320 as described more fully in U.S. Patent Application Publication No. 2018/0275396, filed on Mar. 21, 2018 and entitled "Method and System for Fiber Scanning Projector," the disclosure of which is hereby incorporated by reference in its entirety for all purposes.

As an example, during operation, scanning fiber 320, which is mechanically attached to piezoelectric actuator 312, oscillates in interior region 325 of chassis 120. In an embodiment, piezoelectric actuator 312 includes four electrodes (not shown) that are distributed at circumferential positions that are shifted 90° with respect to each other. Accordingly, positive and negative voltages applied to opposing sides of the piezoelectric actuator can flex the actuator, and the scanning fiber as a result, in the plane of the electrodes. By driving all four electrodes in synchronization, oscillation of the scanning fiber can be accomplished. As the light exits scanning fiber 320, it is coupled into optical assembly section 130.

Figure 4:
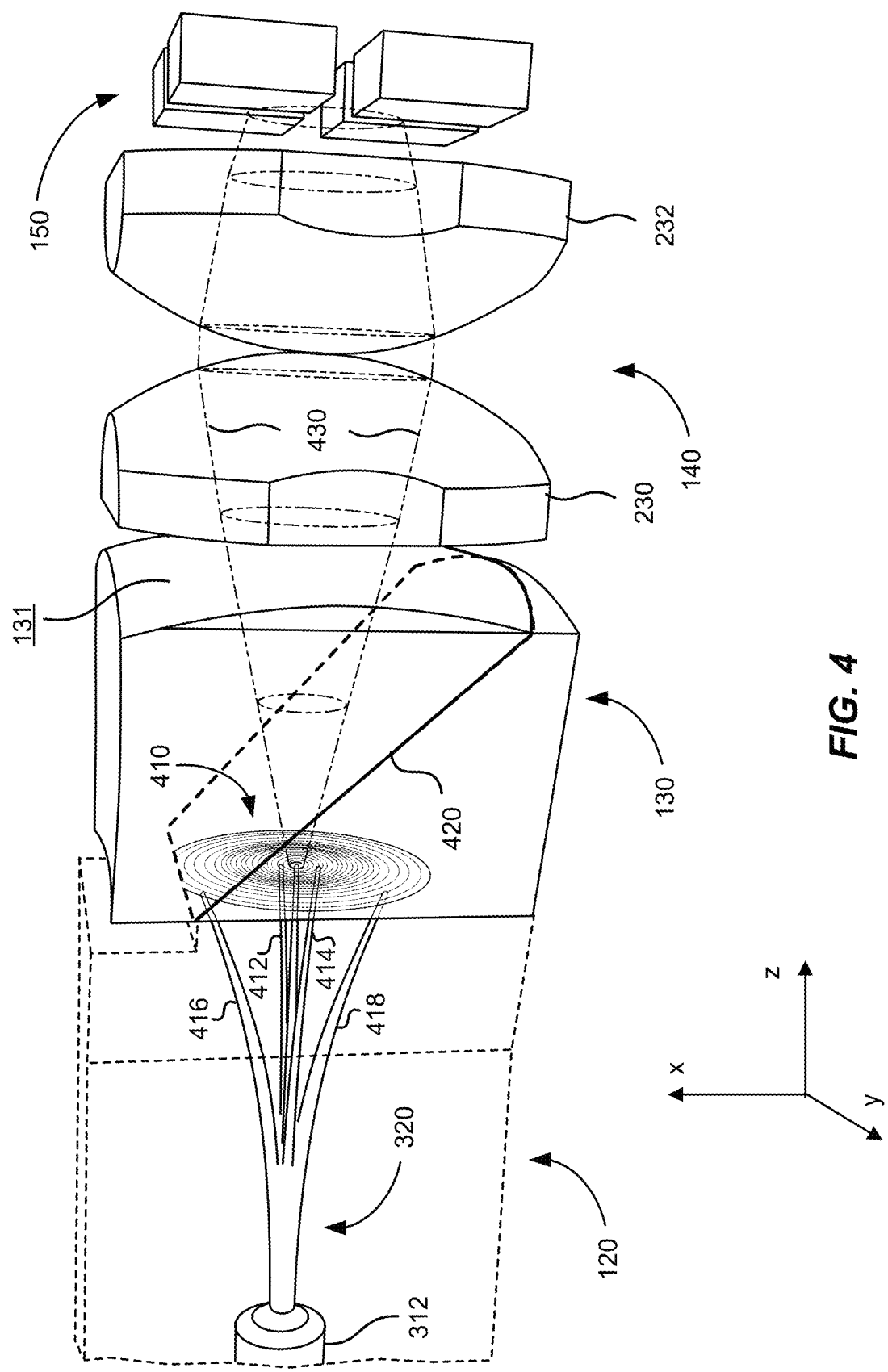
FIG. 4 is a simplified perspective view illustrating light rays and measurement of scanning fiber position in a fiber position detection system according to an embodiment of the present invention.

FIG. 4 is a simplified perspective view illustrating light rays and measurement of scanning fiber position in a fiber position detection system according to an embodiment of the present invention. Referring to FIG. 4, elements illustrated in FIGS. 1-3 are also illustrated in FIG. 4 and the description provided in relation to these elements in FIGS. 1-3 is applicable to FIG. 4 as applicable.

Scanning fiber 320 is illustrated in five different cantilevered positions, including a centered or rest position, illustrated by the scanning fiber being aligned with the longitudinal z-axis; positions 412 and 414 with small amplitude deflection (i.e., position 412 with a slight deflection in the positive x-direction and position 414 with a slight deflection in the negative x-direction); and positions 416 and 418 with large deflections (i.e., position 416 with a large deflection in the positive x-direction and position 418 with a large deflection in the negative x-direction). Although only deflection of scanning fiber 320 in the vertical (i.e., x-direction) is illustrated, it will be appreciated that during a spiral scan pattern, or other suitable raster scanned pattern, deflection in the y-direction will also occur.

As scanning fiber 320 oscillates, a scan pattern 410 is achieved, for example, a spiral scan pattern. Light emitted from scanning fiber 320 in the centered or rest (i.e., undeflected) position is illustrated by light rays 430. As light exits the scanning fiber, the light diverges toward optical assembly section 130. On a first pass, both display light and characterization light propagates through polarizing beamsplitter 420 and display wavelengths are reflected from collimating surface 131 while characterization wavelengths are transmitted through collimating surface 131. As discussed above, in some embodiments, collimating surface 131 is substantially reflective at display wavelengths and substantially transmissive at characterization wavelengths, thereby providing a dichroic or cold mirror.

Therefore, characterization wavelengths pass through collimating surface 131 and propagate toward characterization optics 140, which includes a pair of lens elements 230 and 232. As illustrated by light rays 430, the characterization light is diverging as it passes through collimating surface 131. Accordingly, the characterization light is focused or collimated using characterization optics 140 and then impinges on quadrant detector 150. By measuring the intensity of light incident on each of the four quadrants of the quadrant detector, the position of the light emitted by the scanning fiber, measured in the x-y plane, can be determined. As stated above, when the scanning fiber is positioned at a centered or resting position, the light emitted by the scanning fiber will be centered at the origin of the x-y plane. In some embodiments in which quadrant detector 150 can be mounted in close proximity to optical assembly section 130, characterization optics 140 can be optional.

Figure 5A:
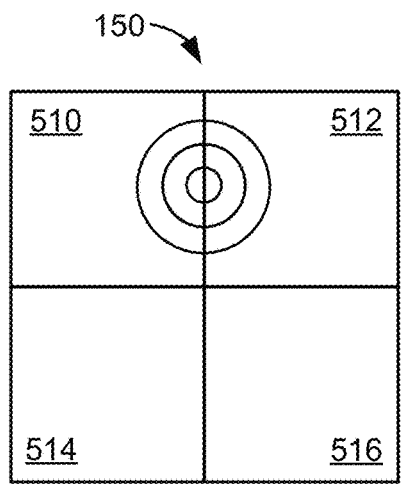
FIG. 5A is a simplified schematic diagram illustrating light incident on a quadrant detector in a first scanning fiber position.
Figure 5B:
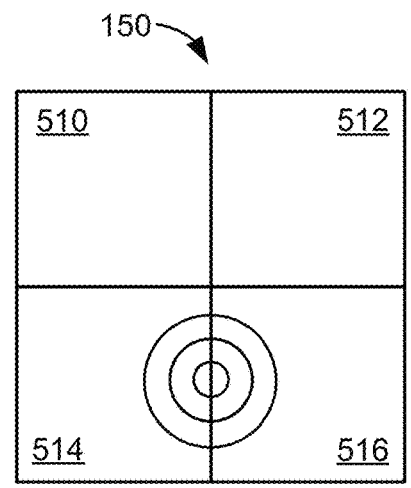
FIG. 5B is a simplified schematic diagram illustrating light incident on a quadrant detector in a second scanning fiber position.

FIG. 5A is a simplified schematic diagram illustrating light incident on a quadrant detector in a first scanning fiber position. FIG. 5B is a simplified schematic diagram illustrating light incident on a quadrant detector in a second scanning fiber position. FIG. 5A corresponds to the scanning fiber being at position 416 illustrated in FIG. 4 and FIG. 5B corresponds to the scanning fiber being at position 418 illustrated in FIG. 4. As illustrated in FIG. 5A, the oscillatory behavior of the scanning fiber has resulted in the scanning fiber being deflected along the positive x-direction to near the maximum amplitude. In this position, light emitted by the scanning fiber produces a light beam that is incident on quadrant detector 150 such that quadrants 510 and 512 receive most of the illumination, with equal illumination of each of quadrants 510 and 512. Referring to FIG. 5B, at another point in time, the oscillatory behavior of the scanning fiber has resulted in the scanning fiber being deflected along the negative x-direction to near the maximum amplitude. In this position, light emitted by the scanning fiber produces a light beam that is incident on quadrant detector 150 such that quadrants 514 and 516 receive most of the illumination, with equal illumination of each of quadrants 514 and 516.

Figure 5C:
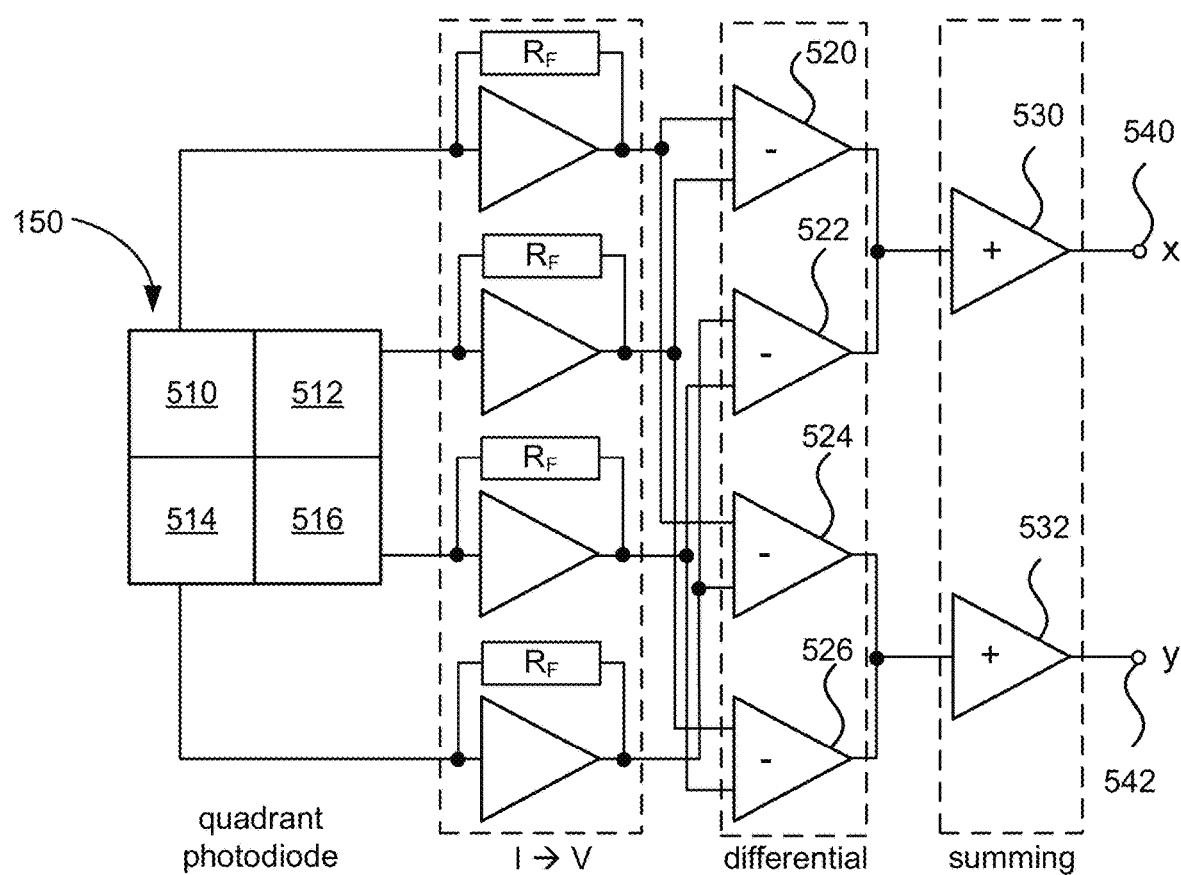
FIG. 5C is a circuit schematic illustrating operation of a quadrant detector according to an embodiment of the present invention.

FIG. 5C is a circuit schematic illustrating operation of a quadrant detector according to an embodiment of the present invention. As illustrated in FIG. 5C, the output (e.g., current) produced by each quadrant of quadrant detector 150 is output to an amplification stage, which can also convert current into voltage. A differential stage is then used to compute the difference between the output of each quadrant using a series of differential amplifiers: differential amplifier 520 producing 510-512; differential amplifier 522 producing 514-516; differential amplifier 524 producing 510-514; and differential amplifier 526 producing 512-516. A summing stage is used to sum the outputs of differential amplifiers 520 and 522 and 524 and 526 using summing circuits 530 and 532, respectively, resulting in the x-component output 540 and the y-component output 542.

Although a particular circuit suitable for operation of a quadrant detector is illustrated in FIG. 5C, this implementation is merely exemplary and other alternative circuits and methods of operation are included within the scope of the present invention.

Figure 6:
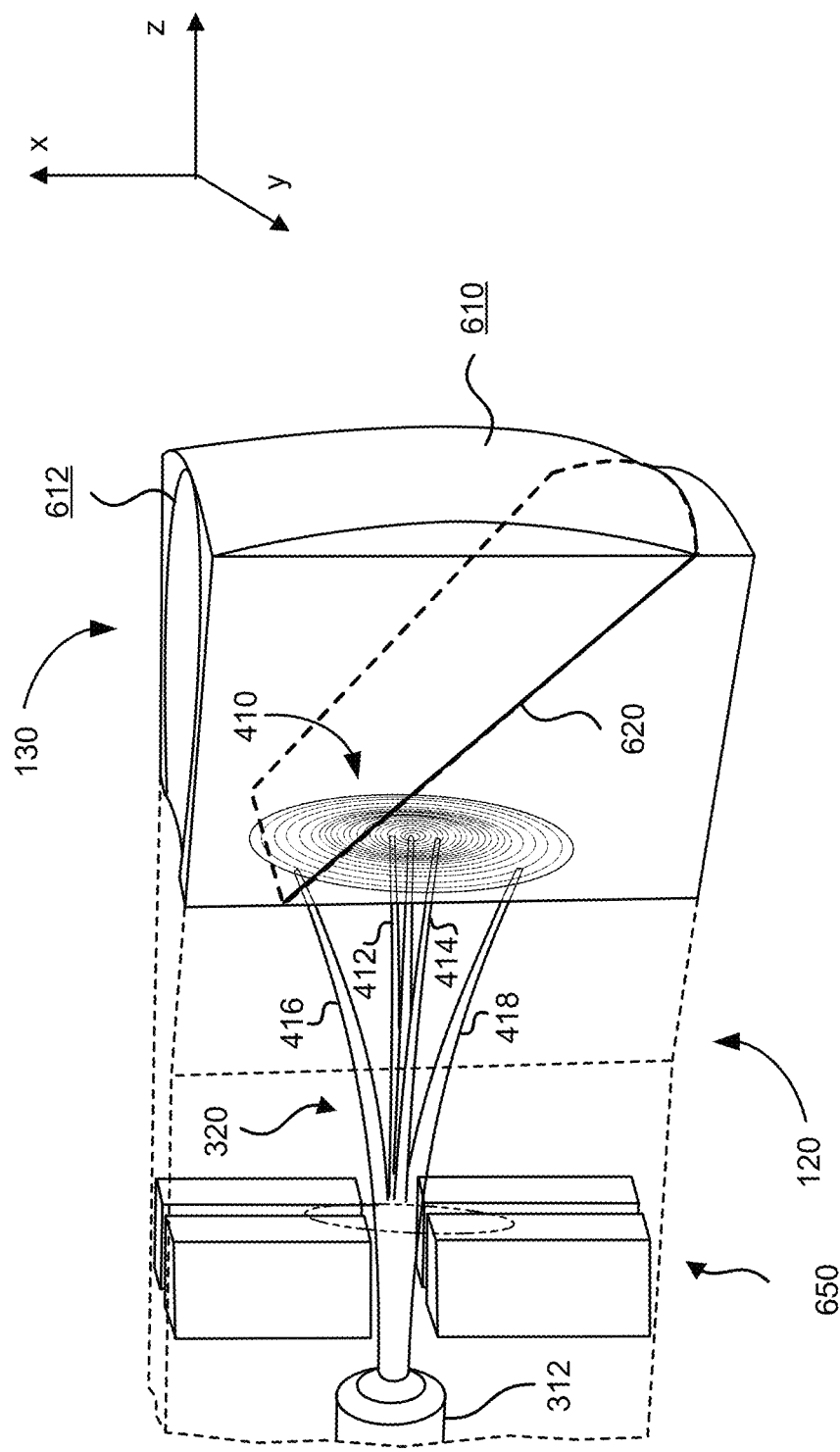
FIG. 6 is a simplified cutaway perspective view illustrating a fiber scanning projector with an integrated scanning fiber position detector according to an embodiment of the present invention.

FIG. 6 is a simplified cutaway perspective view illustrating a fiber scanning projector with an integrated scanning fiber position detector according to an embodiment of the present invention. Elements illustrated in FIGS. 1-4 are also illustrated in FIG. 6 and the description provided in relation to these elements in FIGS. 1-4 is applicable to FIG. 6, as applicable. In FIG. 6, piezoelectric actuator 312 and scanning fiber 320 are illustrated as discussed above. Additionally, as discussed in relation to FIG. 4, scanning fiber 320 is illustrated in five different cantilevered positions, including a centered or rest position as well as positions 412 and 414 with small amplitude deflection (i.e., position 412 with a slight deflection in the positive x-direction and position 414 with a slight deflection in the negative x-direction) and positions 416 and 418 with large deflections (i.e., position 416 with a large deflection in the positive x-direction and position 418 with a large deflection in the negative x-direction), which are a subset of the positions that produce scan pattern 410.

In the embodiment illustrated in FIG. 6, collimating surface 610, rather than being a dichroic or cold mirror, is a reflective surface that reflects both display wavelengths as well as characterization wavelengths. As an example, a metalized coating can be applied to collimating surface 610 to provide a broadband reflector that is reflective at both RGB wavelengths as well as IR wavelengths. Additionally, polarizing beam splitter 620, rather than reflecting/transmitting all wavelengths (assuming the light is in the proper polarization) as is performed in some embodiments, is dichroic (i.e., a dichroic polarizing beam splitter), reflecting/transmitting display light (e.g., RGB wavelengths in the appropriate polarization) efficiently, but transmitting characterization light (e.g., IR wavelengths) independent of polarization. Accordingly, after reflection from collimating surface 610, the display light is reflected toward surface 612 of optical assembly section 130 while the characterization light, which passed through polarizing beam splitter 620 after emission from scanning fiber 320, passes through polarizing beam splitter 620 to impinge on quadrant detector 650, which is mounted in chassis 120 so that the scanning fiber 320 passes through the center of the four quadrants, with the four quadrants disposed laterally (in the x-y plane) with respect to scanning fiber 320.

Thus, comparing the fiber scanning projector in FIG. 6 with that illustrated in FIG. 4, quadrant detector 650 is mounted in chassis 120 and operable to receive characterization light after reflection from collimating surface 610. Accordingly, a compact design is implemented that provides the desired scanning fiber position information.

As discussed in relation to FIG. 4, by measuring the intensity of light incident on each of the quadrants of the quadrant detector, the position of the light emitted by the scanning fiber, measured in the x-y plane, can be determined. As stated above, when the scanning fiber is positioned at a centered or resting position, the light emitted by the scanning fiber will be centered at the origin of the x-y plane. Because the deflection of scanning fiber 320 is small at longitudinal positions close to the piezoelectric actuator, it is possible to provide a small aperture in the center of quadrant detector 650 while still maintaining the functionality of the quadrant detector.

In the embodiment illustrated in FIG. 6, because collimating surface 610 will collimate the characterization light, in a manner similar to the collimation of the display light, the lateral width of the characterization beam at quadrant detector 650 can be reduced in comparison to embodiments in which the characterization light is not collimated. As an alternative to quadrant detector 650, four detectors (e.g., photodiodes) can be mounted laterally with respect to scanning fiber 320, to collect data on the characterization light after reflection from collimating surface 610 and transmission through dichroic polarizing beam splitter 620. One of ordinary skill in the art would recognize many variations, modifications, and alternatives.

Figure 7:
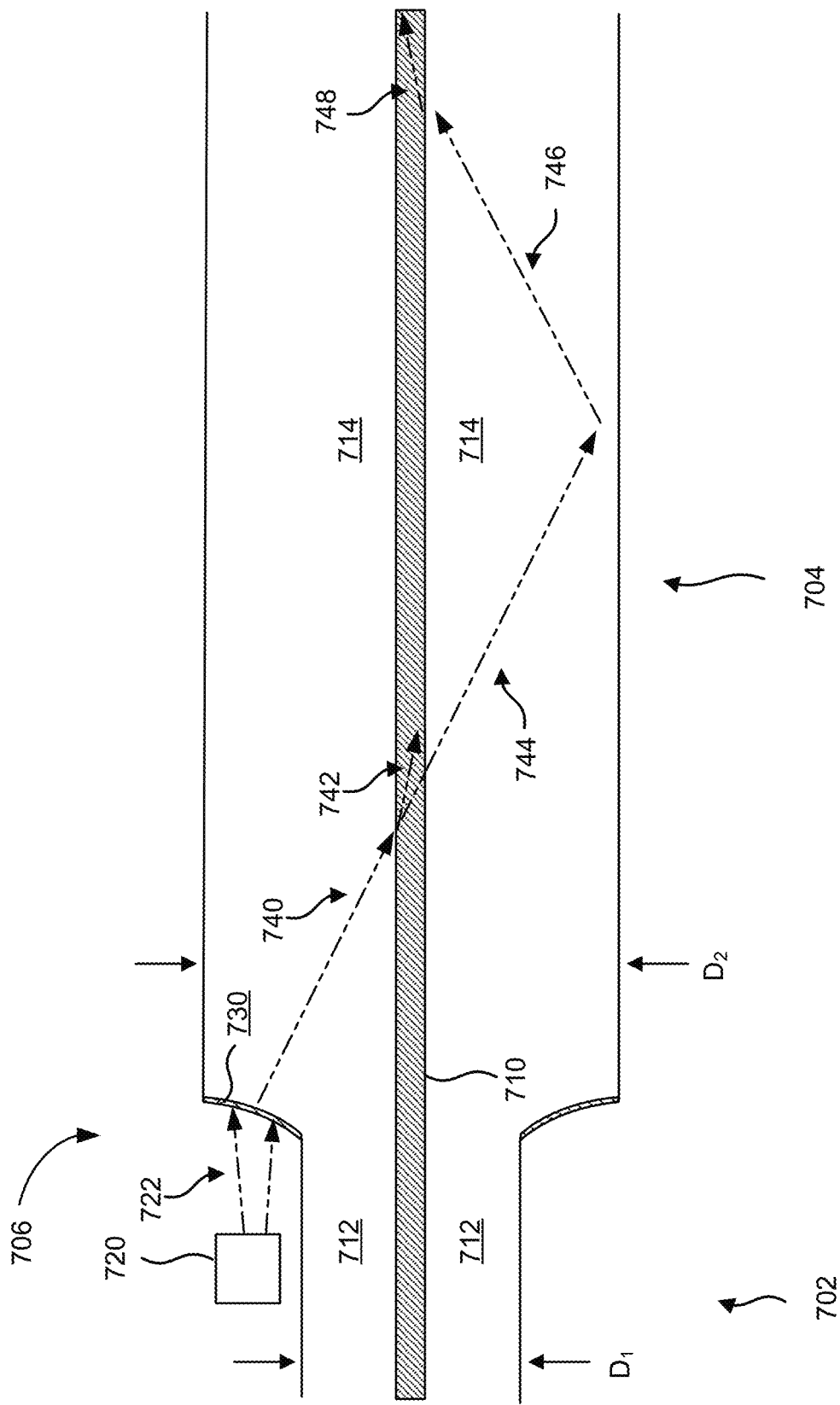
FIG. 7 is a simplified schematic diagram illustrating an optical system suitable for injection of characterization light into an optical fiber according to an embodiment of the present invention.

As discussed in relation to FIG. 1, light at both display wavelengths and characterization wavelengths is present in optical fiber 110. FIG. 7 is a simplified schematic diagram illustrating an optical system suitable for injection of characterization light into an optical fiber according to an embodiment of the present invention. As illustrated in FIG. 7, fiber core 710 is present along the length of the optical fiber, which in this case, includes first fiber 702 with core 710 and cladding 712, having a cladding diameter $D_1$, and second fiber 704, used as the scanning fiber, with core 710 and cladding 712, having a cladding diameter $D_2$. In some embodiments, $D_1$ is 80 µm and second fiber 704 has a tapered profile with $D_2$ equal to 200 µm near the bond interface with first fiber 702 and a diameter at the tip (not shown) of 10 µm.

First fiber 702 and second fiber 704 are joined at a bonding region 706. Fusion bonding or other techniques can be utilized to fabricate the multi-fiber structure illustrated in FIG. 7. Typically, the first fiber and second fiber will be joined at a longitudinal position prior to entering the piezoelectric actuator, since, in some embodiments, the inner diameter of the piezoelectric actuator is matched to the outer diameter of second fiber 704 (e.g., 200 µm). One of ordinary skill in the art would recognize many variations, modifications, and alternatives.

In the embodiment illustrated in FIG. 7, display light is coupled into first fiber 702 using a fiber coupler (not shown). To couple characterization light into the scanning fiber, a light source 720, for example, an IR light emitting diode (LED), is positioned adjacent first fiber 702 near the bonding region 706 (e.g., fusion bond interface 730) between first fiber 702 and second fiber 704. In this position, displaced laterally with respect to the fiber core, characterization light beam 722 impinges on the bonding region 706 (e.g., fusion bond interface 730), refracts through fusion bond interface 730, and begins to propagate in cladding 712 as propagating characterization beam 740. As propagating characterization beam 740 reaches core 710, a portion of propagating characterization beam 740 can be refracted into core 710, illustrated by first core characterization beam 742. Another portion 744 of propagating characterization beam 740 will pass through the core, or pass through the cladding at an angle that results in propagating characterization beam 740 not interacting with the core. As portion 744 reaches the outer edge of cladding 714 of second fiber 704, the light beam can be reflected, for example, through total internal reflection (TIR) if a cladding/air interface is present at the location at which portion 744 impinges on the outer edge of the cladding. Reflected characterization beam 746 is thus illustrated. As discussed in relation to propagating characterization beam 740, as reflected characterization beam 746 reaches core 710, a portion of reflected characterization beam 746 can be refracted into core 710, illustrated by second core characterization beam 748. Therefore, as characterization light is coupled into core 710, this embodiment provides for addition of characterization light to the display light already present in the core of first fiber 702.

Although coupling of characterization light into the core of the scanning fiber is illustrated in FIG. 7, it should be noted that light propagating in cladding 714 of second fiber 704 can also be utilized in determining the position of the scanning fiber. As the characterization light is emitted from second fiber 704, whether from core 710 or cladding 714, the spatial properties of the characterization light can be utilized to determine the scanning fiber position. It should be noted that the optical system in FIG. 7 is suitable for injection of characterization light into the scanning fiber utilized in the embodiments discussed herein, and is particularly useful with respect to the fiber scanning projectors illustrated in FIGS. 1, 3, and 6.

In some embodiments, the cladding of the scanning fiber is metallized to increase the amount of characterization light maintained in the scanning fiber. As an example, a distal end (i.e., near the tip) of second fiber 704 can be at least partially metallized, allowing reflected light propagating in cladding 714 to be reflected and to prevent the characterization light from being transmitted through the cladding/air interface, thereby effectively leaking out of the scanning fiber. Additionally, in fiber scanning projectors that utilize tapered fibers, the tapering of the fiber, either independently or in conjunction with deflection of the scanning fiber, can result in loss of TIR at the cladding/air interface, which would result in the characterization light leaking out of the fiber before it can be detected by the position sensing elements. Thus, to counteract this potential loss of TIR, metallization of the scanning fiber can be utilized to reflect characterization light incident on the cladding/air interface and maintain or reduce the decrease of characterization light intensity in the scanning fiber. It should be noted that these designs will reduce loss of characterization light in embodiments in which the cladding is not surrounded by air, for example, if the cladding is coated with a protective (e.g., plastic) layer. Thus, metallization of the cladding can be beneficial in these designs. In addition to metals, metal alloys, and the like, other materials, including dielectric coatings, can be utilized to enhance reflections of the characterization light at the outer edge of the cladding.

In an alternative embodiment, in order to increase the intensity of the characterization light present in the scanning fiber, a plurality of optical sources can be utilized, for example, multiple IR LEDs mounted around the periphery of the cladding of first fiber 702. Additionally, multiple IR sources can be utilized to implement wavelength multiplexing. As an example, if a first IR wavelength is used for scanning fiber position detection and a second IR wavelength is utilized for eye tracking, LIDAR implementation, or the like, a first IR wavelength band could be injected into second fiber 704 using a first IR LED and a second IR wavelength band different from the first wavelength band could be injected into second fiber 704 using a second IR LED. Thus, a first IR LED emitting in a first IR band and mounted along the positive x-axis could be utilized for scanning fiber position detection and a second IR LED emitting in a second IR band and mounted along the negative x-axis could be utilized for eye tracking. Moreover, a broadband LED emitting at both wavelength bands could be utilized. One of ordinary skill in the art would recognize many variations, modifications, and alternatives.

In another alternative embodiment in which metallization of the cladding is not utilized, a scanning fiber position detection system can utilize one or more photodetectors that are positioned laterally with respect to the scanning fiber and operable to detect characterization light that leaks out of the scanning fiber as the characterization light propagates along the scanning fiber. For example, as the scanning fiber oscillates in a spiral scan pattern, the deflection of the scanning fiber will increase during the frame time. Characterization light injected into the scanning fiber as illustrated in FIG. 7 and leaking out of the scanning fiber as the characterization light impinges on the outer edge of the cladding can be utilized to determine the position of the scanning fiber as a function of time. For instance, as the deflection of the scanning fiber increases, the amount of characterization light leaking out of the fiber will increase and the measurement of this characterization light exiting the scanning fiber can be utilized to determine the amount of deflection, which can then be correlated to the position of the tip of the scanning fiber. In order to determine the amount of deflection in the x-y plane, two photodetectors disposed along the longitudinal axis of the scanning fiber, one mounted along the x-axis and one mounted along the y-axis, can be utilized to measure the deflection in the x-direction and y-direction and determine the position of the tip of the scanning fiber.

Figure 8:
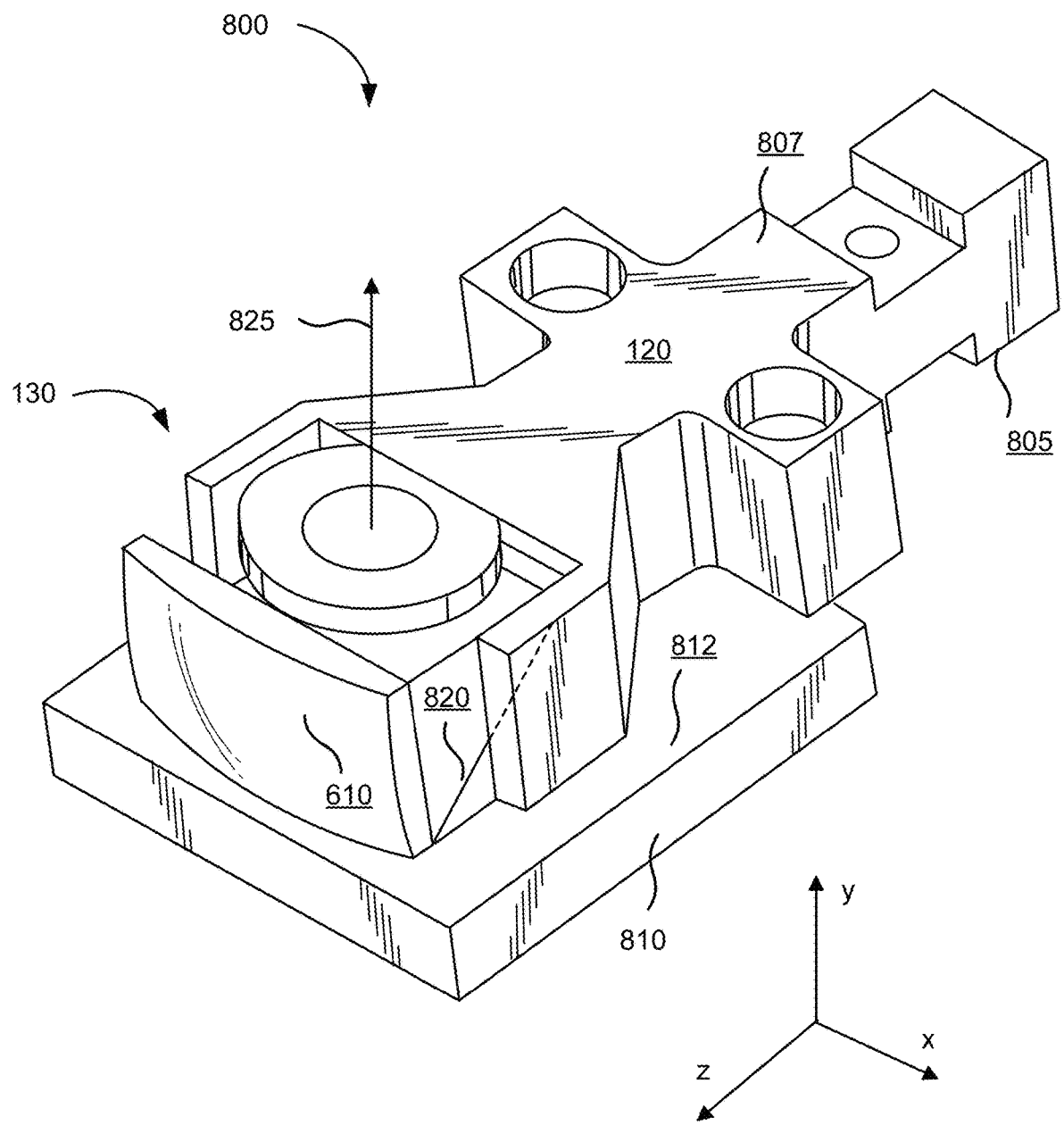
FIG. 8 is a simplified cutaway perspective view illustrating a fiber scanning projector with an integrated position sensing system according to an embodiment of the present invention.

FIG. 8 is a simplified cutaway perspective view illustrating a fiber scanning projector with an integrated position sensing system according to an embodiment of the present invention. Referring to FIG. 8, fiber scanning projector 800 is illustrated and includes chassis 120 and optical assembly section 130. Additional elements, including optical fiber 110 and other elements, are described more fully herein and are not illustrated in FIG. 8 for purposes of clarity. Light emitted from the scanning fiber, which includes both display light and characterization light, propagates toward optical assembly section 130. Chassis 120 includes a characterization side 805, which is illustrated as the bottom surface or side in FIG. 8, and an emission side 807, which is illustrated as the top surface or side in FIG. 8. As described more fully below, characterization side 805 provides a mounting surface for optical elements utilized in characterization of the position of the scanning fiber and emission side 807 provides an optical path for emission of display light.

In the embodiment illustrated in FIG. 8, polarizing beam splitter 820, rather than reflecting all wavelengths as is performed in some embodiments, is dichroic, transmitting display light (e.g., RGB wavelengths in the appropriate polarization) efficiently during a first pass, but reflecting characterization light (e.g., IR wavelengths) during the first pass. Accordingly, the display light is transmitted toward collimating surface 610 of optical assembly section 130 while the characterization light is reflected toward characterization side 805 and optical sensor 810. Thus, on a second pass, the display light reflects off polarizing beam splitter 820, thereby providing output beam 825, whereas the characterization light impinges on optical sensor 810, which is positioned below optical assembly section 130 and can be mounted to chassis 120.

In an embodiment, optical sensor 810 is a camera having a two-dimensional pixel array that is able to detect and determine the position of the tip of the scanning fiber in the x-y plane. As the scanning fiber oscillates, the beam of characterization light emitted by the scanning fiber moves in the x-y plane and use of a camera as an optical sensor as illustrated in FIG. 8 can thus be used to measure the x-y coordinate position of the scanning fiber based on the measured light intensity on the two-dimensional optical sensor.

In another embodiment, optical sensor 810 is a position sensing diode (PSD) that is positioned below the optical assembly section 130. Since a PSD can detect a beam that impinges on the PSD and output an x-y coordinate position of the incident beam, a PSD can be used to detect the position of the light reflected from polarizing beam splitter 820 as it is reflected toward optical sensor 810. As the scanning fiber oscillates, resulting in scanning of the output, the position of the scanned output can be measured and the position of the scanning fiber can be determined. In the embodiment illustrated in FIG. 8, the PSD can be bonded or otherwise joined to the bottom surface of optical assembly section 130, but this is not required by the present invention. As an alternative to a PSD, a quadrant detector as discussed above, for example, in relation to FIGS. 1, 2, and 5A-C, can be utilized as optical sensor 810, thereby providing the x-y coordinate position of the scanning fiber based on the measured light intensity on the four quadrants.

Figure 9:
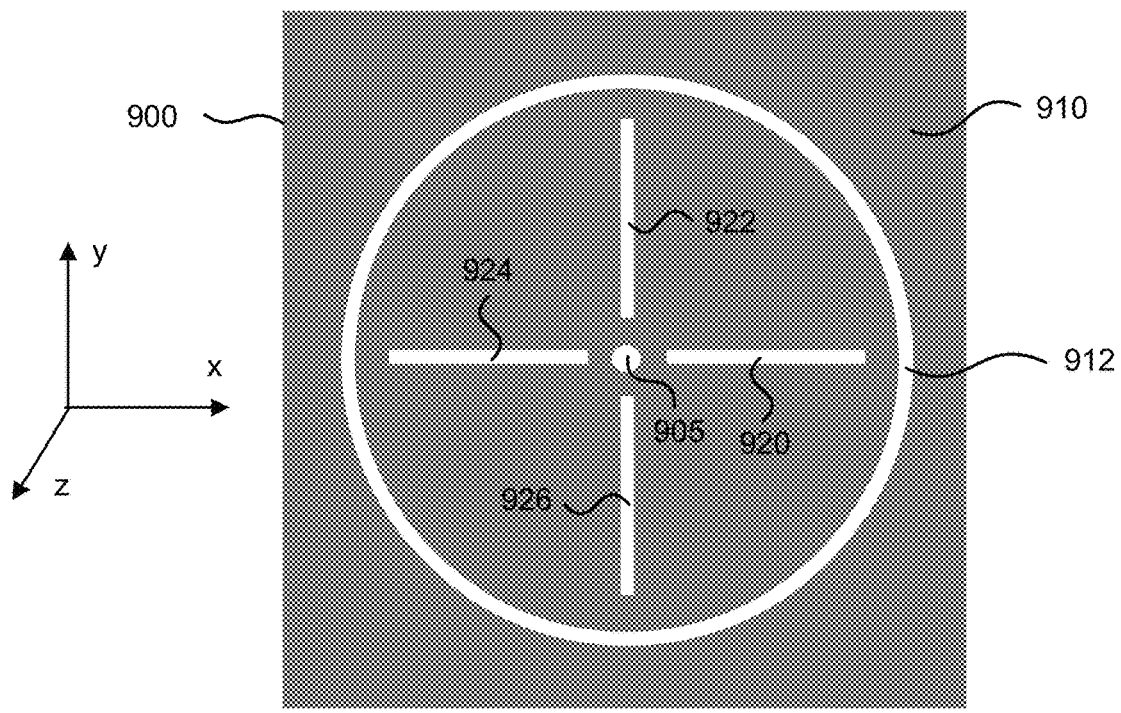
FIG. 9 is a simplified plan view schematic diagram of a transmission mask according to an embodiment of the present invention.

In yet another embodiment, optical sensor 810 is a photodiode utilized in conjunction with a transmission mask. FIG. 9 is a simplified plan view schematic diagram of a transmission mask according to an embodiment of the present invention. Referring to FIG. 9, transmission mask 900 includes shaded (i.e., gray) areas 910 that are opaque and transparent areas (referenced below) that are transparent to the incident characterization light after reflection from dichroic polarizing beam splitter 820. Although opaque and transparent areas are illustrated in FIG. 9, 100% opacity and transparency are not required by the present invention and substantial opacity and transparency are sufficient to implement the designs discussed herein. As an example, a glass or plastic plate, approximately 2 mm thick, can be selectively coated with a thin (e.g., 100 nm or greater) layer of chrome to form the opaque and transparent areas of transmission mask 900. In another embodiment, a silicon-on-insulator (SOI) substrate is utilized as the basis for transmission mask 900. In this embodiment, an SOI substrate (e.g., having a device layer with <1 mm in thickness) is etched to remove transparent areas and then the patterned device layer is released from the handle layer. The resulting structure provides a transmission mask less than 1 mm in thickness.

Referring to FIG. 8, transmission mask 900 can be placed above surface 812 and between optical assembly section 130 and optical sensor 810. In this embodiment, optical sensor 810 is a single element photodiode that utilizes a single pixel and measures intensity as a function of time. As described more fully below in relation to FIGS. 10A-10C, as the scanning fiber crosses transparent areas 920, 922, 924, and 926, light is detected by the photodiode, resulting in the generation of an intensity vs. time profile.

Figure 10A:
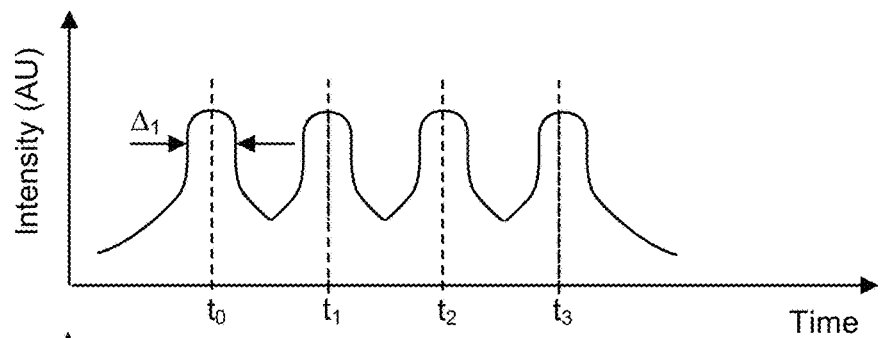
FIG. 10A is a simplified plot of photodiode output as a function of time for a first scanning fiber radial dimension.
Figure 10B:
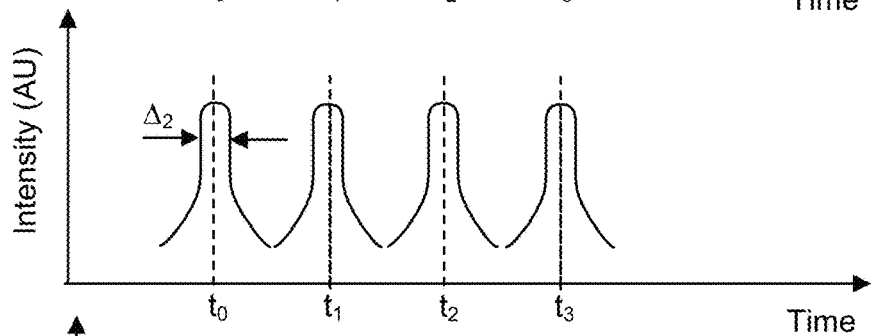
FIG. 10B is a simplified plot of photodiode output as a function of time for a second scanning fiber radial dimension.
Figure 10C:
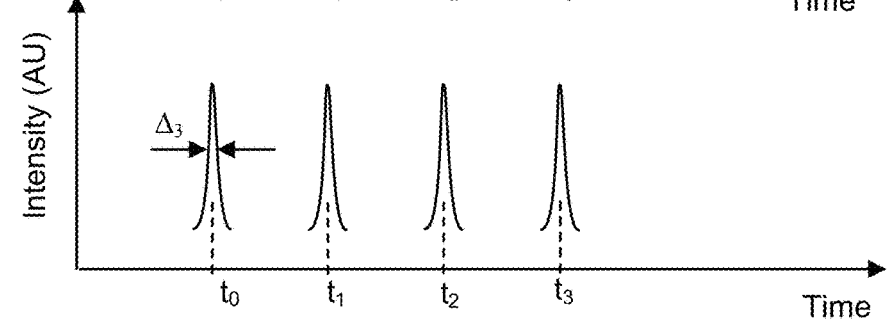
FIG. 10C is a simplified plot of photodiode output as a function of time for a third scanning fiber radial dimension.

FIG. 10A is a simplified plot of photodiode output as a function of time for a first scanning fiber radial dimension. FIG. 10B is a simplified plot of photodiode output as a function of time for a second scanning fiber radial dimension. FIG. 10C is a simplified plot of photodiode output as a function of time for a third scanning fiber radial dimension.

Considering FIG. 10A, the plot illustrated in this figure is associated with the scanning fiber traversing a spiral scan pattern at a first radial dimension that is close to the centered or rest position, for example, a radial dimension that is ~20% of the maximum radius. As the scanning fiber traverses the spiral scan pattern, it moves in a substantially circular arc at the given radial distance. Because the period of oscillation is substantially constant as a function of the radial dimension, the time during which the scanning fiber makes a single pass, from a position aligned with the positive x-axis, to a position aligned with the positive y-axis, to a position aligned with the negative x-axis, to a position aligned with the negative y-axis, is substantially constant, for example, ~7.5 μs. Although environmental disturbance can impact the period of oscillation, a display controller can be utilized to vary the piezoelectric actuator and the optical source (e.g., diode laser) to reduce or minimize environmental disturbances. For an exemplary scanner operating at 33 kHz, and not limiting embodiments of the present invention, the period of oscillation, which will depend on the frequency of the scanner, can be ~7.576 μs–(33 kHz*4)$^{-1}$.

Referring to FIG. 10A, as the light emitted from the scanning fiber passes transparent area 920 at time $t_0$, a signal is detected at the photodiode serving as optical sensor 810. Accordingly, an intensity pulse with temporal width $\Delta_1$ is measured, for example, at the full width half maximum (FWHM) value. Because the scanning fiber is covering a small linear distance (at this small radial dimension) to complete a single pass, the temporal width $\Delta_1$ is large in comparison to the smaller temporal widths that will be measured at larger radial dimensions. Similarly, as the light emitted from the scanning fiber passes transparent area 922 at time $t_1$, a second signal is detected at the photodiode serving as optical sensor 810. The second signal has the same temporal width $\Delta_1$ because the scanning fiber is substantially still at the same radial dimension. As the light emitted from the scanning fiber passes transparent areas 924 and 926 at times $t_2$ and $t_3$, third and fourth signals with substantially the same temporal width $\Delta_1$ are detected at the photodiode serving as optical sensor 810. It should be noted that the speed of the scan is slowly increasing with the radius of the scan pattern. Thus, it will be appreciated that the temporal width $\Delta_1$ will decrease slightly as the light projected by the scanner passes from transparent area 920 to transparent areas 922, 924, and 926, respectively, demonstrating a smooth gradual change.

Referring to FIG. 10B, the plot illustrated in this figure is associated with the scanning fiber traversing a spiral scan pattern at a second radial dimension that is approximately half of the maximum deflection, for example, a radial dimension that is ~50% of the maximum radius. In FIG. 10B, similar signals are detected at times $t_0$, $t_1$, $t_2$, and $t_3$, as the scanning fiber passes the transparent areas 920, 922, 924, and 926. As discussed above, since the time for a single pass is substantially constant despite the radial dimension, the periodicity of the signals in FIG. 10B matches the periodicity measured in FIG. 10A. The temporal width $\Delta_2$ is less than temporal width $\Delta_1$ since the tangential velocity increases with radial dimension as the circumference of the arc traveled by the tip of the scanning fiber increases with radial dimension. Thus, the decrease in temporal width provides information on the increase in the radial distance of the tip of the scanning fiber from the centered or rest position.

Referring to FIG. 10C, the plot illustrated in this figure is associated with the scanning fiber traversing a spiral scan pattern at a third radial dimension that is approaching the maximum deflection, for example, a radial dimension that is ~80% of the maximum radius. In FIG. 10C, the periodicity of the signals continues to be constant while the temporal width $\Delta_3$ continues to decrease as the tangential velocity continues to increase with radial dimension.

In addition to the transparent areas aligned with the x-axis and the y-axis, transparent area 905 enables measurement of the scanning fiber being positioned at the centered or rest position and transparent area 912 enables measurement of the scanning fiber being at the maximum deflection, which is associated with the field of view of the fiber scanning projector. Thus, transparent area 905 can be utilized during the braking process, ensuring the desired settling of the scanning fiber before the scanning of the next frame is started, with the desired settling being evidenced by a flat signal with an intensity equal to the maximum intensities shown in FIGS. 10A-10C. When the scanning fiber reaches the field of view over the entire pass, the detected signal will be a flat signal with an intensity equal to the maximum intensities shown in FIGS. 10A-10C. Although transparent area 912 is surrounded by opaque areas in FIG. 9, this is not required and the area surrounding transparent area 912 can be transparent. One of ordinary skill in the art would recognize many variations, modifications, and alternatives.

By measuring the times to through $t_3$ and the temporal width (e.g., $\Delta_1$ through $\Delta_4$ as examples), it is possible to determine the radial distance that the scanning fiber is displaced from the centered or rest position during the pass. In order, for example, in polar coordinates, to determine the angular position of the scanning fiber (i.e., θ of (r, θ)) as a function of time, one of the transparent areas can be utilized to provide a baseline angular position.

As an example, in order to utilize the first intensity pulse as a reference, the radial dimension of transparent area 920 can be modified to extend closer toward transparent area 905. Accordingly, as the fiber scans out a spiral pattern (e.g., in a counterclockwise direction) with a period of T μs, the projected light would cross 920 first at time to, resulting in generation of an initial intensity pulse. As additional intensity pulses are measured at times ~T/4, T/2, 3T/4 and T μs following the initial intensity pulse, it can be determined that these additional intensity pulses correspond to the projected light passing transparent areas 922, 924, 926, and 920 respectively.

In some implementations, factory calibration can be utilized to calibrate the baseline angular position, which can then be utilized during the lifetime of the device. In an alternative embodiment, one or more of the transparent areas can be modified with respect to the other transparent areas, providing a higher or lower transparency. Because, in this implementation, the intensity of the pulse would vary depending on the transparency level of the particular transparent area, the pulse intensity can be measured and utilized to determine the baseline angular position. As an example, if transparent area 920 were less transparent than transparent areas 922, 924, and 926, the reduced intensity measured as the projected light crosses transparent area 920 can be utilized to baseline the angular position. Accordingly, several methods and systems are included within the scope of the present invention to enable the measurement of the angular position and the radial distance that the scanning fiber is displaced from the centered or rest position as a function of time.

It should be noted that, in some embodiments, the angular position is not utilized and the radial distance is sufficient for the particular application. For example, in order to maintain display stability over time, full (r, θ) information may not be necessary. For instance, after factory calibration, the pulse width and time stamp of each pulse could be stored in a memory. During operation, these stored values can be compared to values measured using the system illustrated in FIG. 9 and discussed in relation to FIGS. 10A-10C. If the measured values differ from the stored values, the drive voltage provided to the piezoelectric actuator and/or diode laser can be adjusted to compensate for drift from the factory calibration values and return the pulse width and time stamps of each pulse back to the factory calibration values. One of ordinary skill in the art would recognize many variations, modifications, and alternatives.

Although the description related to FIG. 9 utilizes transmission mask 900 that is independent from optical sensor 810, this is not required by the present invention and, in some embodiments, the entrance aperture, for example, the window at the front of the photodiode can be coated to form a transmission mask.

Figure 11:
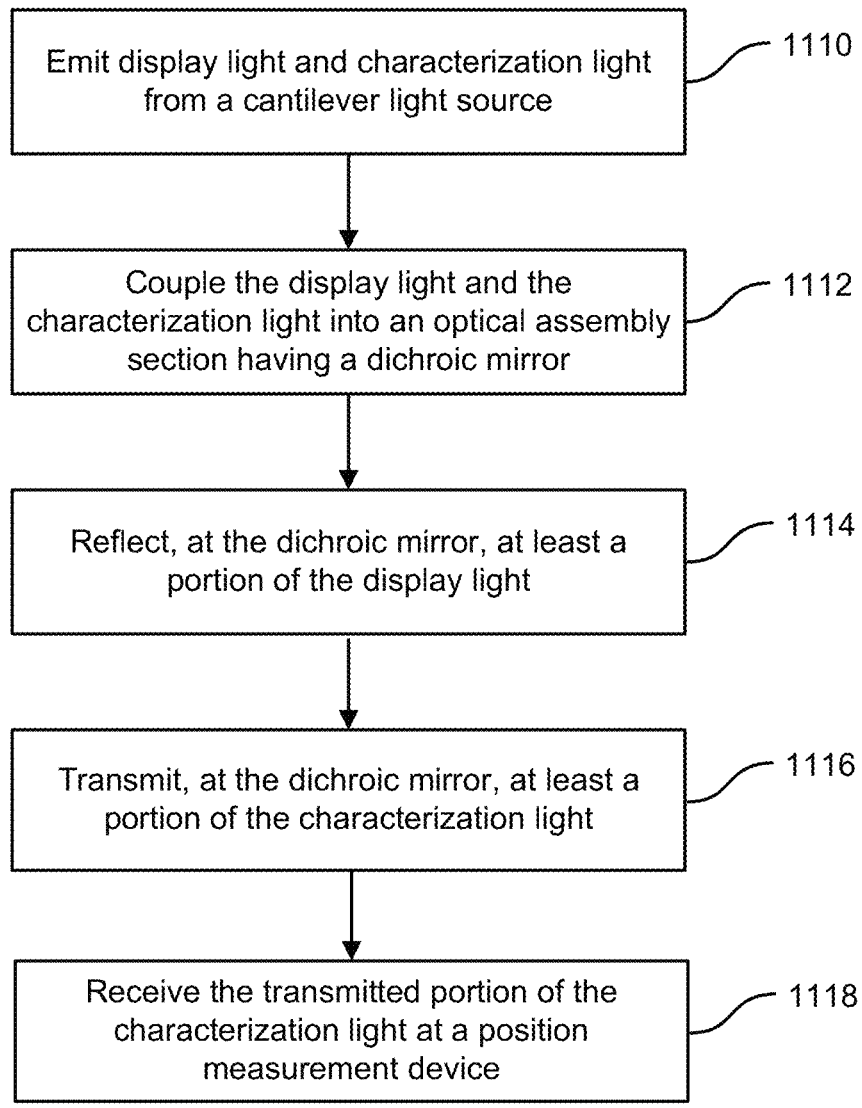
FIG. 11 is a simplified flowchart illustrating a method of measuring a position of a scanning cantilever using a quadrant detector according to an embodiment of the present invention.

FIG. 11 is a simplified flowchart illustrating a method of measuring a position of a scanning cantilever using a position measurement device such as a quadrant detector according to an embodiment of the present invention. The method includes emitting display light and characterization light from a cantilever light source (1110) and coupling the display light and the characterization light into an optical assembly section having a dichroic mirror (1112). The display light can include visible wavelengths and the characterization light can include infrared wavelengths. The cantilever light source can include a scanning fiber that can include a reflective coating. As an example, the scanning fiber can include a first fiber and a second fiber joined at a bonding region. In this example, the first fiber has a first cladding diameter and the second fiber has a second cladding diameter greater than the first cladding diameter and the method includes injecting the characterization light into a cladding of the second fiber at the bonding region.

The method also includes reflecting, at the dichroic mirror, at least a portion of the display light (1114) and transmitting, at the dichroic mirror, at least a portion of the characterization light (1116). The method further includes receiving the transmitted portion of the characterization light at a position measurement device (1118), for example, a quadrant detector. In some embodiments, a scanning fiber can be characterized by a longitudinal axis and the quadrant detector can be disposed in a lateral plane orthogonal to the longitudinal axis.

In some embodiments, the method can include focusing at least a portion of the characterization light using characterization optics disposed between the dichroic mirror and the position measurement device.

It should be appreciated that the specific steps illustrated in FIG. 11 provide a particular method of measuring a position of a scanning cantilever using a position measurement device such as a quadrant detector according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
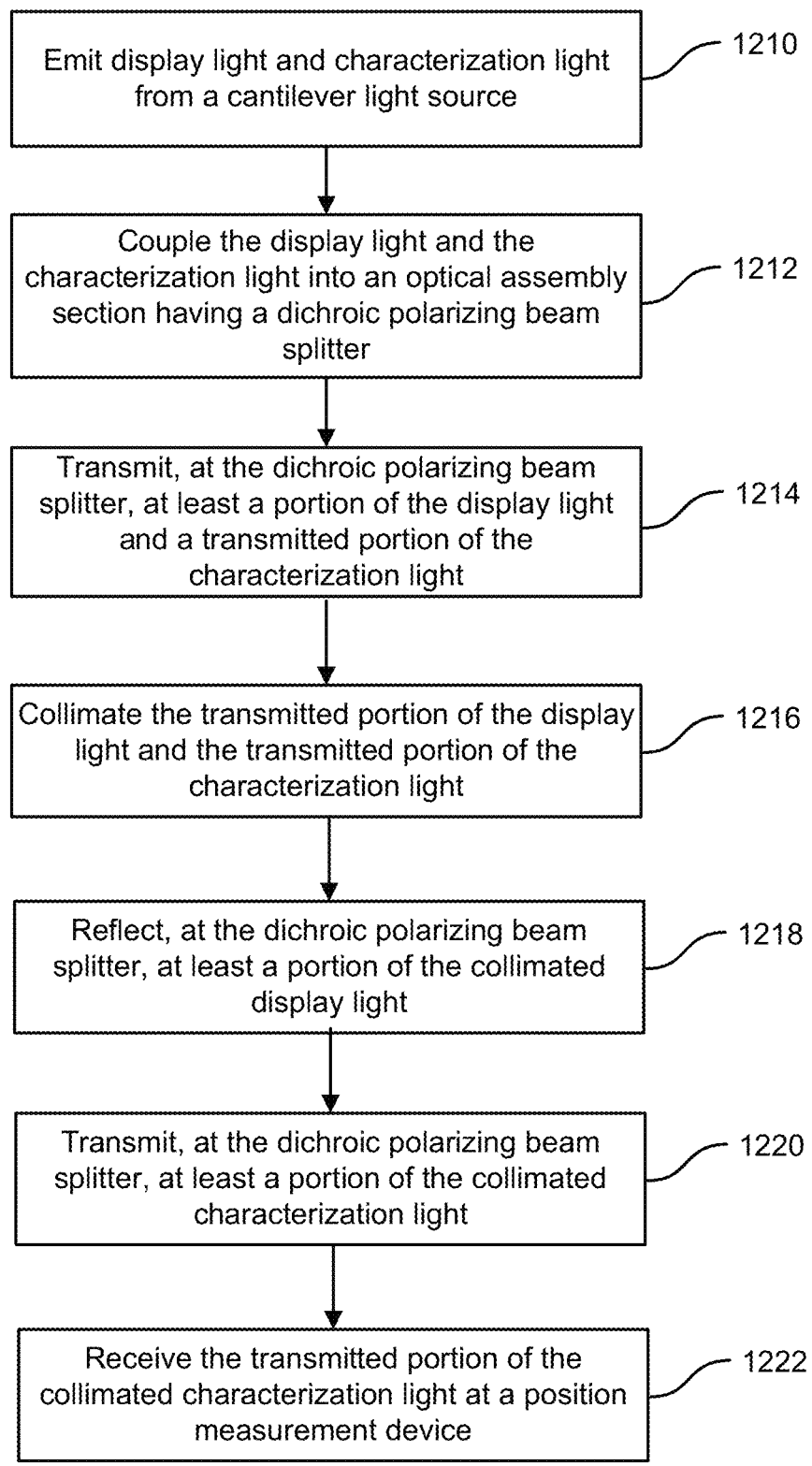
FIG. 12 is a simplified flowchart illustrating a method of measuring a position of a scanning cantilever using a photodiode and transmission mask according to an embodiment of the present invention.

FIG. 12 is a simplified flowchart illustrating a method of measuring a position of a scanning cantilever using a position measurement device such as a quadrant detector according to an embodiment of the present invention. The method includes emitting display light and characterization light from a cantilever light source (1210) and coupling the display light and the characterization light into an optical assembly section having a dichroic polarizing beam splitter (1212). The display light can include visible wavelengths and the characterization light can include infrared wavelengths.

The cantilever light source can include a scanning fiber, which can include a reflective coating. As an example, the scanning fiber can include a first fiber and a second fiber joined at a bonding region. The first fiber has a first cladding diameter and the second fiber has a second cladding diameter greater than the first cladding diameter and the method also includes injecting the characterization light into a cladding of the second fiber at the bonding region. Moreover, the scanning fiber can be characterized by a longitudinal axis and the quadrant detector can be disposed in a lateral plane orthogonal to the longitudinal axis.

The method also includes transmitting, at the dichroic polarizing beam splitter, a transmitted portion of the display light and a transmitted portion of the characterization light (1214) and collimating the transmitted portion of the display light and the transmitted portion of the characterization light (1216). The method further includes reflecting, at the dichroic polarizing beam splitter, at least a portion of the collimated display light (1218), transmitting, at the dichroic polarizing beam splitter, at least a portion of the collimated characterization light (1220), and receiving the transmitted portion of the collimated characterization light at a position measurement device (1222). The position measurement device can include a quadrant detector. In another embodiment, the position measurement device includes an aperture and the cantilever light source passes through the aperture.

It should be appreciated that the specific steps illustrated in FIG. 12 provide a particular method of measuring a position of a scanning cantilever using a position measurement device such as a quadrant detector according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
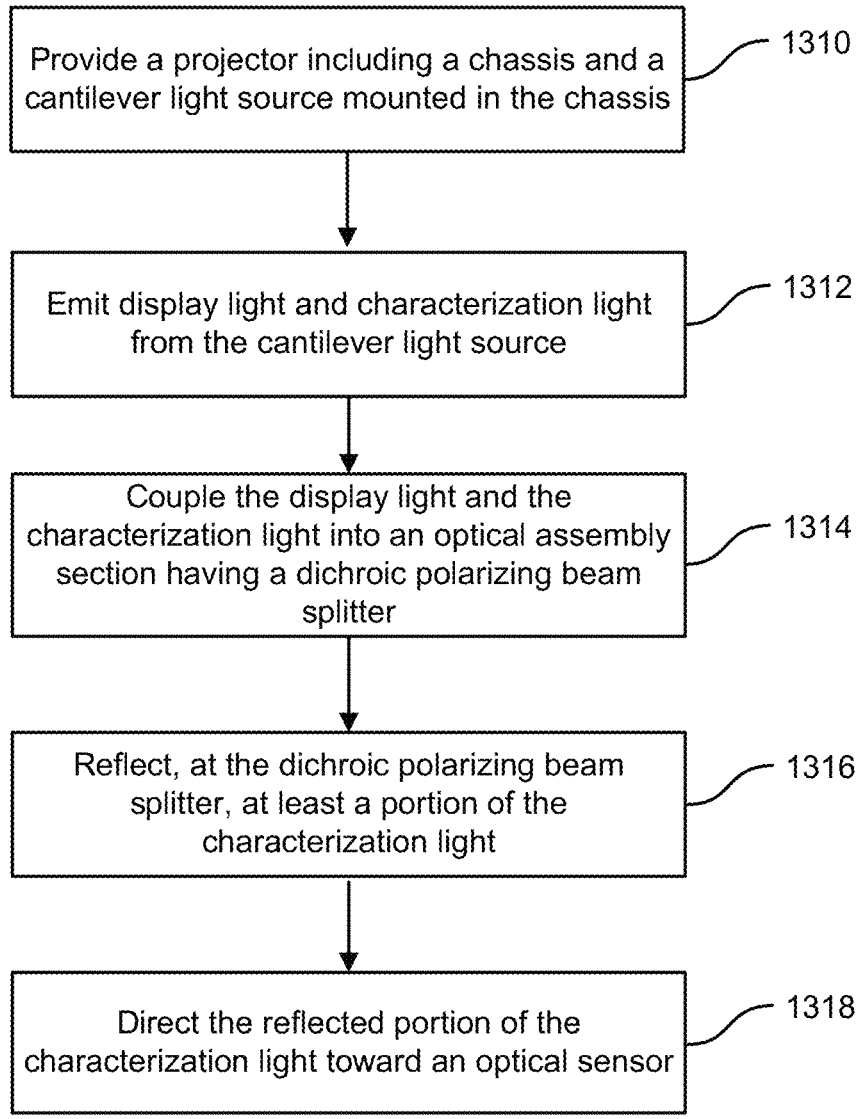
FIG. 13 is a simplified flowchart illustrating a method of measuring a position of a scanning cantilever using a photodiode and transmission mask according to an embodiment of the present invention.

FIG. 13 is a simplified flowchart illustrating a method of measuring a position of a scanning cantilever using a photodiode and transmission mask according to an embodiment of the present invention. The method includes providing a projector including a chassis having a support side and an emission side and a cantilever light source mounted in the chassis (1310). The cantilever light source can include a MEMS element including a cantilevered waveguide. The method also includes emitting display light and characterization light from the cantilever light source (1312) and coupling the display light and the characterization light into an optical assembly section having a dichroic polarizing beam splitter (1314). The display light can include visible wavelengths and the characterization light can include infrared wavelengths.

The method further includes reflecting, at the dichroic polarizing beam splitter, at least a portion of the characterization light toward the support side (1316) and directing the reflected portion of the characterization light toward an optical sensor (1318). In an embodiment, the optical sensor includes a camera having a two-dimensional pixel array. In another embodiment, the optical sensor includes a position sensing diode. In yet another embodiment, the optical sensor includes a single element photodiode and the method further includes filtering the reflected portion of the characterization light through a transmission mask and directing the filtered characterization light to the single element photodiode. The transmission mask may be disposed between the optical assembly section and the single element photodiode.

In some embodiments, the cantilever light source includes a scanning fiber including a first fiber and a second fiber joined at a bonding region. The first fiber has a first cladding diameter and the second fiber has a second cladding diameter greater than the first cladding diameter. In these embodiments, the method also includes injecting the characterization light into a cladding of the second fiber at the bonding region. Moreover, the method may include coupling into and propagating a portion of the characterization light in a cladding of the second fiber.

It should be appreciated that the specific steps illustrated in FIG. 13 provide a particular method of measuring a position of a scanning cantilever using a photodiode and transmission mask according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
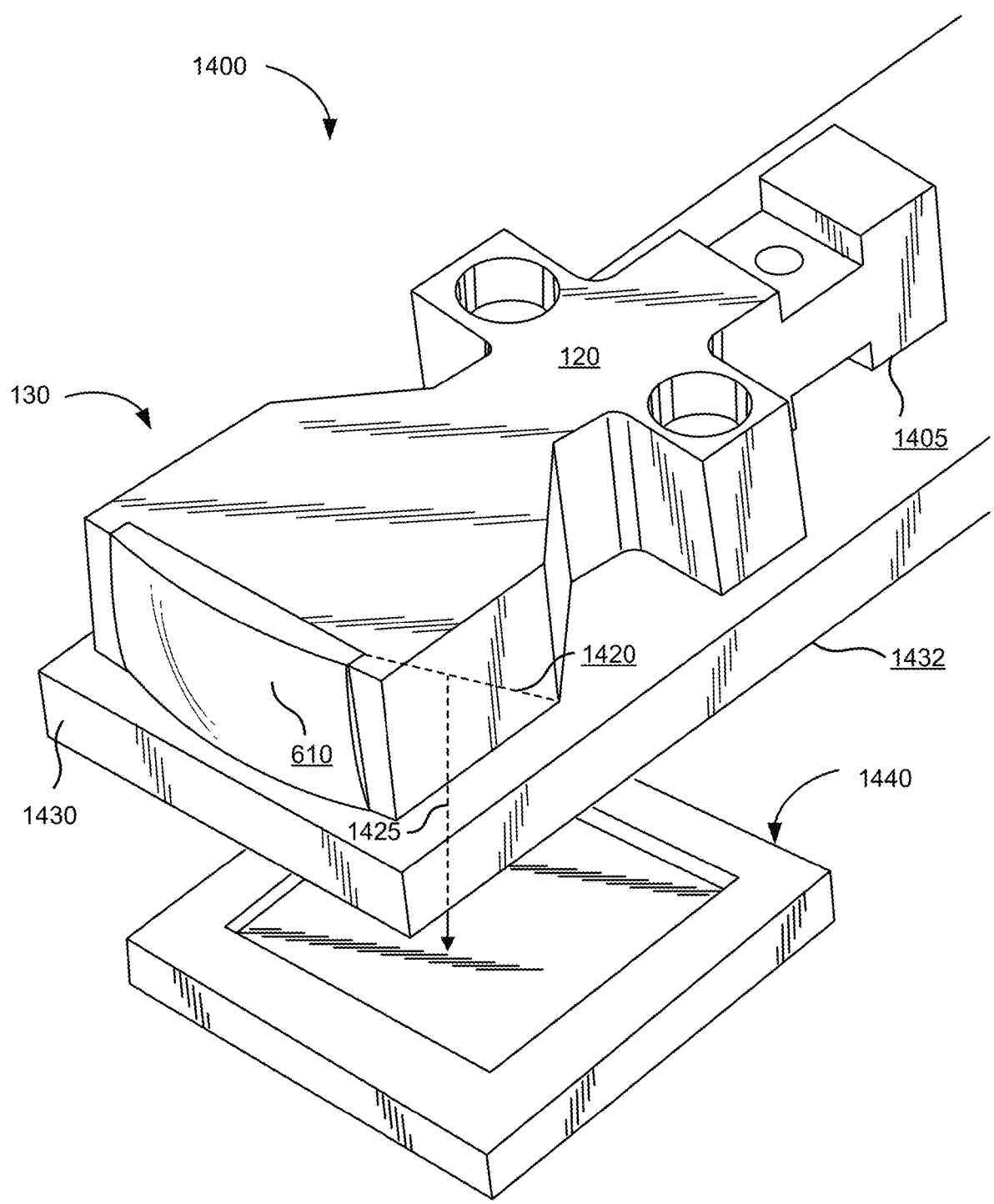
FIG. 14 is a simplified cutaway perspective view illustrating a fiber scanning projector with an integrated position sensing system according to an embodiment of the present invention.

FIG. 14 is a simplified cutaway perspective view illustrating a fiber scanning projector with an integrated position sensing system according to an embodiment of the present invention. In reference to FIG. 14, fiber scanning projector 1400 is illustrated and includes chassis 120 and optical assembly section 130. Additional elements, including optical fiber 110 and other elements are not illustrated in FIG. 14 for purposes of clarity. Light emitted from the scanning fiber, which includes both display light and characterization light, propagates toward optical assembly section 130. Chassis 120 includes a combined emission/characterization side 1405, which is illustrated as the bottom surface or side in FIG. 14. In contrast to the fiber scanning projector described in reference to FIG. 8 (e.g., fiber scanning projector 800 of FIG. 8), combined emission/characterization side 1405 provides an optical path for emission of both display light and characterization light, as well as a mounting surface for optical elements utilized in characterization of the position of the scanning fiber, as described more fully below.

In the embodiment illustrated in FIG. 14, polarizing beam splitter 1420 is a broadband polarizing beam splitter such that it transmits display light (e.g., RGB wavelengths in the appropriate polarization) as well as characterization light (e.g., IR wavelengths similarly polarized) efficiently during a first pass. Accordingly, the display light and the characterization light are transmitted toward collimating surface 610 of optical assembly section 130. On a second pass after collimation by collimating surface 610, the display light and the characterization light reflect off polarizing beam splitter 1420, thereby providing output beam 1425 that includes both display light and characterization light. As will be evident to one of skill in the art, in this embodiment, a film on the interface between polarizing beam splitter 1420 and collimating surface 610 will be used as a quarter wave plate. This film converts the light between linear and circular polarization states. Circularly polarized light, upon reflection from collimating surface 610, will have its polarization state changed because of the reflection. This light is then converted back to linear polarization by the film and thus reaches the beam splitter surface in a state that results in the reflection of both display light and characterization light.

According to embodiments of the present invention, reflections at the various interfaces present in the optical assembly can be reduced to improve system performance. For example, the interface between optical assembly section 130 and optical waveguide 1430 can be coated with antireflection films, bonded with a bonding agent, characterized by a separation between elements using an air gap, coated with an index matching film, or the like. For instance, optical assembly section 130 can include a cover glass on the surface facing optical waveguide 1430 in which the cover glass has an antireflection coating. Similarly, the surface of optical waveguide 1430 facing optical assembly section 130 can include an antireflection coating. One of ordinary skill in the art would recognize many variations, modifications, and alternatives.

As illustrated in FIG. 14, an optical waveguide 1430, which may be implemented as an eyepiece waveguide as described more fully below, may be mounted or may otherwise optically communicate with optical assembly section 130. For example, optical waveguide 1430 may be mounted such that output beam 1425 enters optical waveguide 1430 substantially without refraction or reflection at the interface between optical waveguide 1430 and optical assembly section 130. After diffraction of display light into optical waveguide 1430, the display light may then be conducted by total internal reflection toward additional diffractive elements or display components (not shown). Concurrently, optical waveguide 1430 will exhibit low optical coupling, e.g., diffractive coupling, and high transparency with respect to characterization light, as described in more detail below. In this way, the characterization light passes through optical waveguide 1430 and impinges on optical sensor 1440, which is positioned below optical assembly section 130 and chassis 120.

In an embodiment, optical sensor 1440 is a camera, for example, a CMOS imager, having a two-dimensional pixel array that is able to detect and determine the position of the light emitted by the tip of the scanning fiber in the x-y plane. As the scanning fiber oscillates, the beam of characterization light emitted by the scanning fiber moves in the x-y plane and use of a camera as an optical sensor as illustrated in FIG. 14 can thus be used to measure the x-y coordinate position of the scanning fiber based on the measured light intensity on the two-dimensional optical sensor.

In another embodiment, optical sensor 1440 is a position sensing diode (PSD) that is positioned below the optical assembly section 130. Since a PSD can detect a beam that impinges on the PSD and output an x-y coordinate position of the incident beam, a PSD can be used to detect the position of the light reflected from polarizing beam splitter 1420 as it is reflected toward optical sensor 1440. As the scanning fiber oscillates, resulting in scanning of the output, the position of the scanned output can be measured and the position of the scanning fiber can be determined. In the embodiment illustrated in FIG. 14, the PSD can be bonded or otherwise joined to bottom surface 1432 of optical waveguide 1430, but this is not required by the present invention. As an alternative to a PSD, a quadrant detector, as discussed above, for example, in relation to FIGS. 1, 2, and 5A-C, can be utilized as optical sensor 1440, thereby providing the x-y coordinate position of the scanning fiber based on the measured light intensity on the four quadrants.

Although the discussion provided in relation to FIG. 14 relates to the use of display light and characterization light, embodiments of the present invention are not limited to the use of characterization light. In some embodiments, a portion of the display light is utilized during the process of measuring the position of the scanning fiber. As an example, a portion of the display light could pass through optical waveguide 1430 without diffracting into the waveguide and then be detected using optical sensor 1440. One of ordinary skill in the art would recognize many variations, modifications, and alternatives.

Figure 15A:
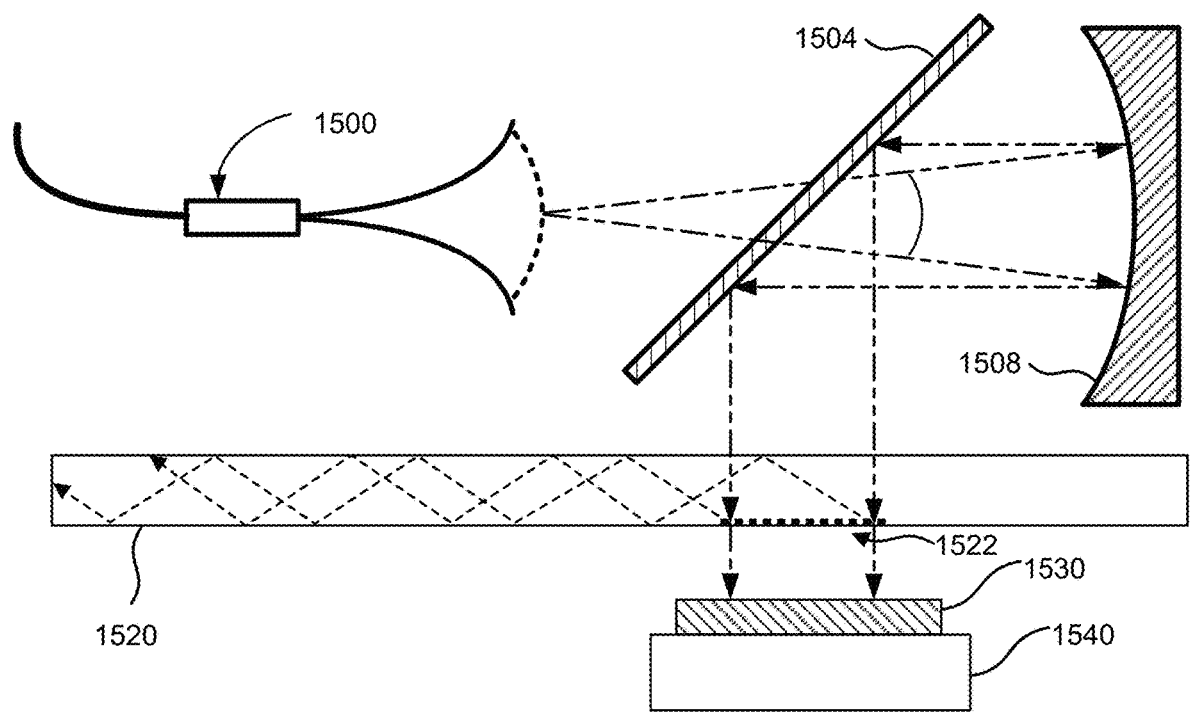
FIG. 15A is a simplified schematic diagram illustrating a fiber scanning projector with an integrated position sensing system according to an embodiment of the present invention.
Figure 15B:
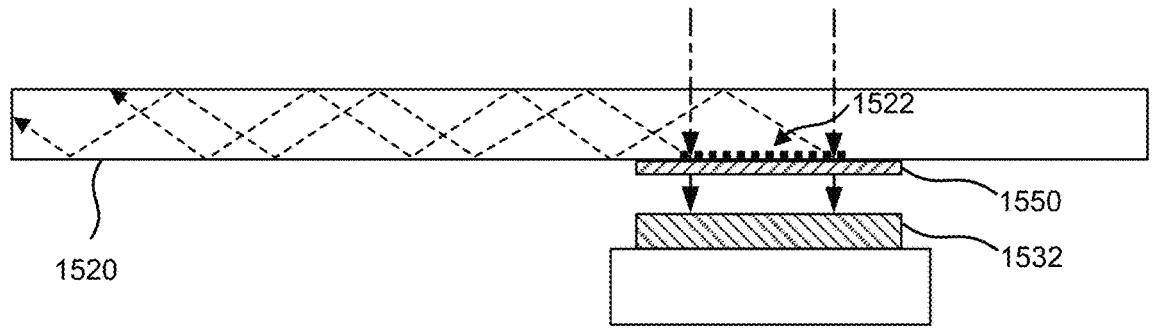
FIG. 15B is another simplified schematic diagram illustrating another fiber scanning projector with an integrated position sensing system according to an embodiment of the present invention.
Figure 15C:
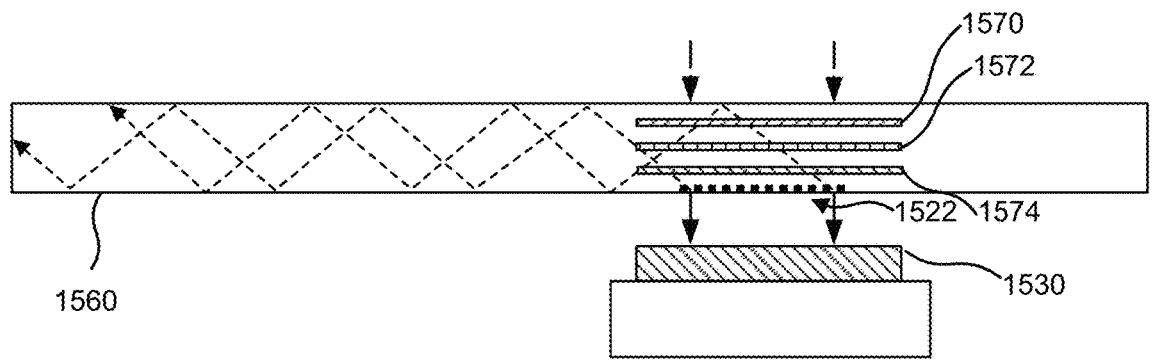
FIG. 15C is another simplified schematic diagram illustrating another fiber scanning projector with an integrated position sensing system according to an embodiment of the present invention.

FIGS. 15A-15C illustrate a fiber scanning projector with an integrated position sensing system according to one or more embodiments of the present invention. In reference to FIG. 15A, fiber scanning projector 1500 is illustrated with several components omitted to simplify the description. In FIGS. 15A-15C, combined display and characterization light emitted from the fiber scanning projector are transmitted through polarizing beamsplitter 1504 during a first pass toward collimating surface 1508. As described in more detail in reference to FIG. 14, polarizing beamsplitter 1504 is a broadband optic permitting transmission of both display and characterization wavelengths in the forward direction. As discussed in relation to FIG. 14, a quarter waveplate is integrated into the optical system between polarizing beamsplitter 1504 and collimating surface 1508 in order to rotate the polarization of the reflected light. Light reflected from the collimating surface 1508 back toward polarizing beamsplitter 1504 will thus be reflected toward optical waveguide 1520, which includes an incoupling diffractive optical element (DOE) 1522, for example, a diffractive incoupling grating (ICG) operable to diffract display light into optical waveguide 1520. The display light then propagates by total internal reflection toward additional components (not shown) including, but not limited to, outcoupling DOE(s) and display optics (e.g., light conditioning optics and/or other elements of an eyepiece) for viewing by a user. Characterization light is transmitted through optical waveguide 1520 toward optical sensor 1530. As described in more detail in reference to FIG. 14, optical sensor 1530 may include a position sensing device (e.g., a position sensing diode (PSD)) or a digital camera, and may be mounted directly to the optical waveguide 1520 or to a substrate 1540 positioned at a distance from the bottom surface of the optical waveguide 1520.

In reference to FIG. 15B, a mask 1550 (e.g., transmission mask 900 of FIG. 9) is disposed on a surface of optical waveguide 1520, such that only a portion of the characterization light is transmitted to optical sensor 1532. As described in more detail in reference to FIG. 9, the mask 1550 may include a pattern of one or more transparent areas, as described in more detail in reference to FIG. 9, above, and FIG. 16B, below. In such cases, optical sensor 1532 may be a single photodiode sensitive to the wavelength of characterization light, such that transmission intensity data is collected as a function of time, from which both the radial position and the rotational velocity of the fiber is determined.

In reference to FIG. 15C, one or more volume Bragg gratings (VBGs) are formed in optical waveguide 1560 to direct display light toward one end of optical waveguide 1560, as described in more detail in reference to FIG. 16, below. In brief, VBGs are periodic structures formed within a transparent medium or on the material surface to modulate the material's index of refraction in a localized manner, thereby forming a diffraction grating. VBGs are typically formed by holographic methods using multiple interfering light sources to generate a localized thermal deformation in the material. As such, the spacing between elements of the periodic structure may be tuned to interact with light of a specific wavelength. A first VBG 1570 is configured to partially diffract display light of a specific wavelength (e.g., wavelength corresponding to light in the red portion of the visible wavelength range of wavelengths), wherein the proportion of display light that is diffracted by first VBG 1570 is a function of a grating efficiency that is a material property of first VBG 1570 set during fabrication. Similarly, second VBG 1572 and third VBG 1574 diffract display light of different wavelength ranges (e.g., light in the green portion and the blue portion of the visible wavelength range, respectively), such that display light of different wavelengths that may enter optical waveguide 1560 is diffracted from an incident angle to an angle satisfying a total internal reflection condition for transmission through optical waveguide 1560. VBGs may also be formed in such a way that they interact with characterization light to correct for aberrations or other artifacts of the multiple optical components interposed between the scanning fiber and optical sensor 1530, for example, by partially diffracting characterization light from an incident angle to an angle approximately orthogonal to the surface of optical sensor 1530.

Figure 16A:
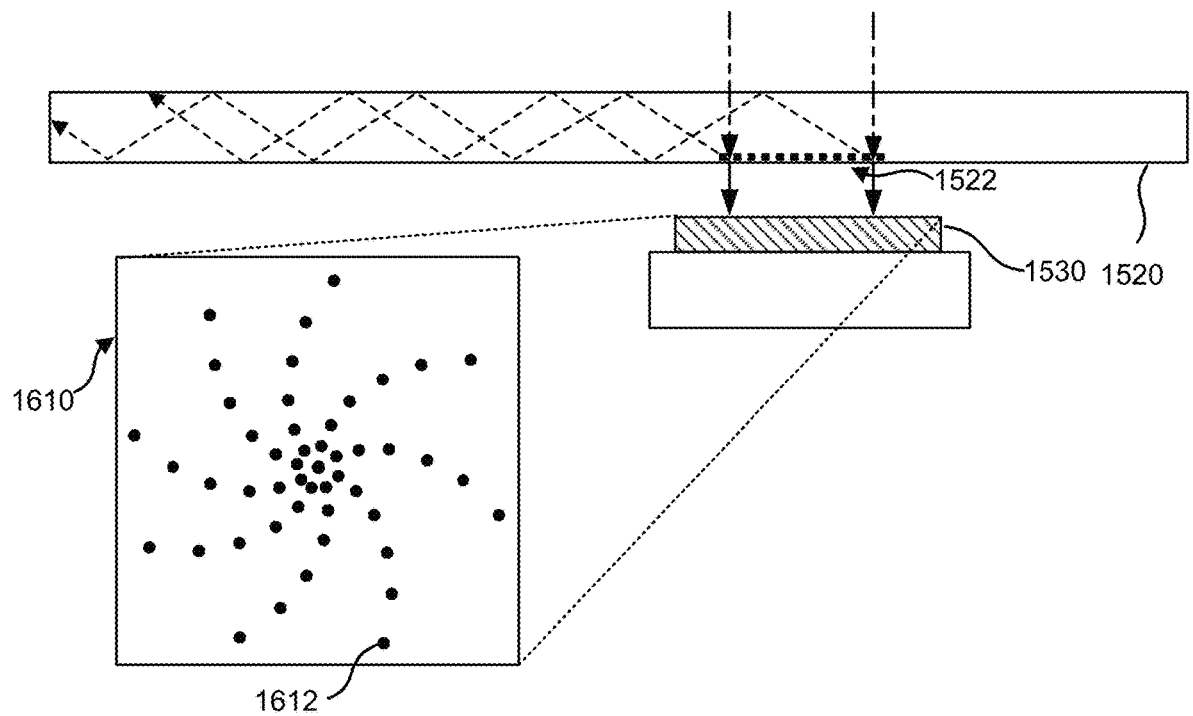
FIG. 16A is a simplified schematic diagram illustrating a fiber scanning projector with an integrated position sensing system including a position sensing device according to an embodiment of the present invention.
Figure 16B:
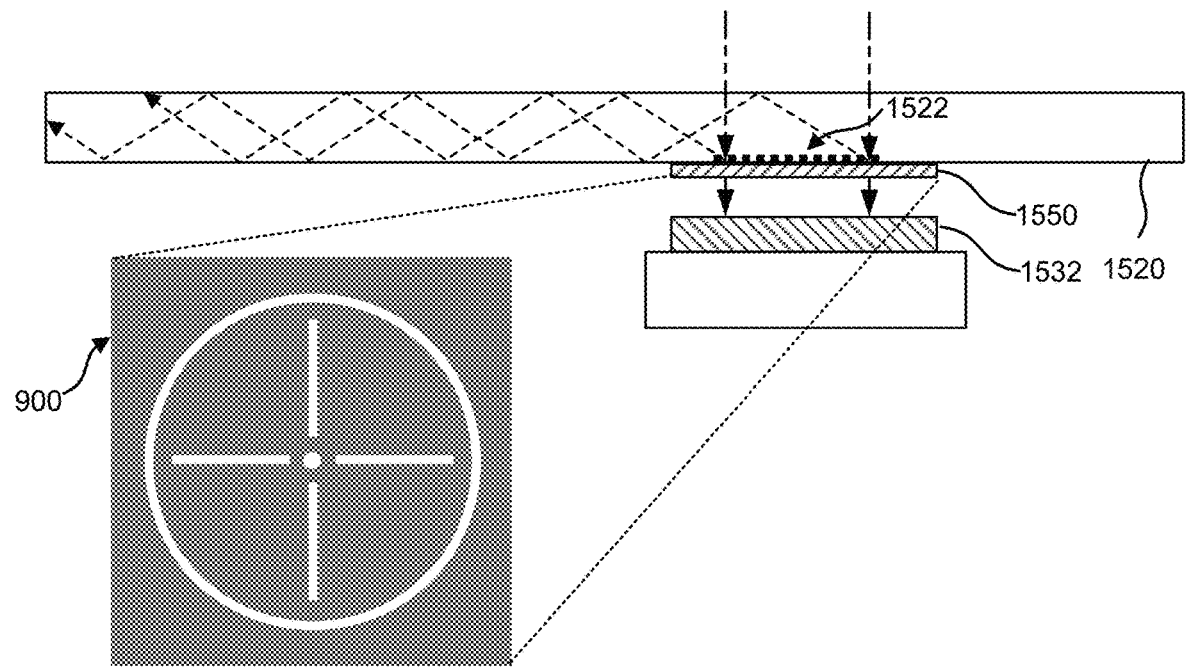
FIG. 16B is a simplified schematic diagram illustrating a fiber scanning projector with an integrated position sensing system including a transmission mask according to an embodiment of the present invention.
Figure 16C:
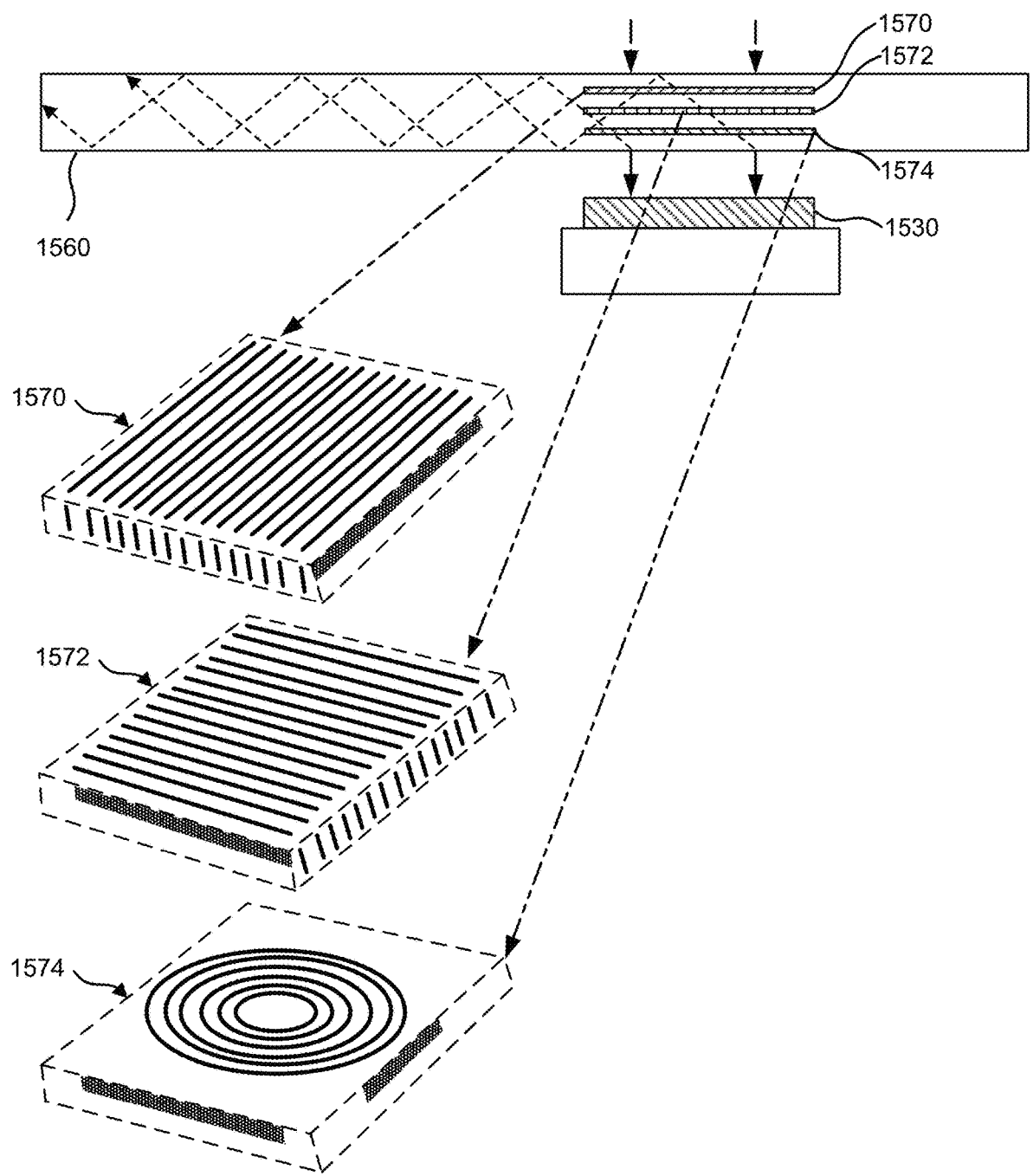
FIG. 16C is a simplified schematic diagram illustrating a fiber scanning projector with an integrated position sensing system including volume Bragg gratings according to an embodiment of the present invention.

FIGS. 16A-16C illustrate a fiber scanning projector with an integrated position sensing system according to embodiments of the present invention. As illustrated in FIG. 16A, optical sensor 1530, as described in more detail in reference to FIG. 15, includes a two-dimensional position sensing device (e.g., a position sensing diode) that directly measures characterization light as a function of time forming a light pattern 1610. In FIG. 16A, light pattern 1610 is a time-integrated image made up of multiple light points 1612. The position of each light point 1612 in two-dimensional light pattern 1610 is determined by the position of the scanning fiber at the time each light point 1612 is sampled, such that the overall path of the scanning fiber tip is divided into a number of discrete data points that are integrated to generate light pattern 1610. The position and velocity of the scanning fiber is determined by comparing light pattern 1610 to a standard pattern (not shown), for example, an analytically generated light pattern or a simulated light pattern. The standard pattern may be generated as a function of scanning fiber motion pattern and speed, such that light pattern 1610 may be correlated to the motion characteristics of the fiber scanning projector as a function of time.

As illustrated in FIG. 16B, transmission mask 1550 is disposed on a surface of an optical waveguide (e.g., optical waveguide 1520 of FIG. 15), as described in more detail in reference to FIG. 9, and utilized in conjunction with a quadrant detector. Transmission mask 1550 can be fabricated as part of the DOE/ICG fabrication process, for example, in conjunction with fabrication of a metallized ICG. As an example, a reticle can be formed by at least two openings in the metallization of the ICG to allow light in a cross-shaped pattern to pass through the metallized ICG. The cross-shaped pattern can be divided into four distinct openings as shown in FIG. 16B. Additional or alternative openings can be formed in the mask at areas relating to particular regions of interest for the scanning pattern. For example, a small opening near the center of the scan pattern can provide information about the location of the scanning fiber tip at the beginning or end of a scan cycle and a circular cutout can provide information about the location of the scanning fiber tip during the largest fiber displacement portion of the scan pattern. As described in reference to FIGS. 10A-10C, optical sensor 1532 may detect light intensity as a function of time, generating periodic data from which both the rotational frequency and radial position of the scanning fiber tip may be determined. Such calculations permit the determination of the position and speed of the tip as a function of time. Thus, using a non-uniform metallization of an ICG on an optical waveguide, embodiments of the present invention enable projection of a time-varying signal that is correlated with the position of the scanning element of the scanning projector, for instance, a fiber scanning projector.

As illustrated in FIG. 16C, optical waveguide 1560 includes multiple diffraction gratings, as described in more detail in reference to FIG. 15C. In FIG. 16C, multiple distinct diffraction gratings, which may be implemented as volume Bragg gratings (VBGs), are shown, although one or more gratings may be replaced with surface gratings, or other optics. Additionally, multiple VBGs may be spatially multiplexed, such that the overall size occupied by the VBGs is reduced. The positions of the multiple diffraction gratings results in differing amount of characterization light passing through the multiple diffraction gratings as a function of the angle of incidence of the characterization light on the multiple diffraction gratings. As an example, if the characterization light is incident at normal incidence, a first amount of characterization light will pass through optical waveguide 1560 and be incident on optical detector 1530. When the scanning element, e.g., the scanning fiber of the fiber scanning projector, moves to a new position, resulting in the incidence angle of the characterization light changing to another angle of incidence, a second amount of characterization light will pass through optical waveguide 1560 and be incident on optical detector 1530. Accordingly, the position of the scanning element can be determined using the embodiment illustrated in FIG. 16C.

Referring to FIG. 16C, first grating 1570 is a linear grating having multiple grating elements aligned in parallel along a first direction, while second grating 1572 is a linear VBG having multiple grating elements aligned in parallel along a second direction orthogonal to the first direction. Third grating 1574 is shown as a concentric VBG having circular grating elements formed in concentric circles around a central point. As shown in FIG. 16C, multiple grating configurations are possible to diffract display light into optical waveguide 1560 and/or guide characterization light through optical waveguide 1560 toward optical sensor 1530.

Figure 17A:
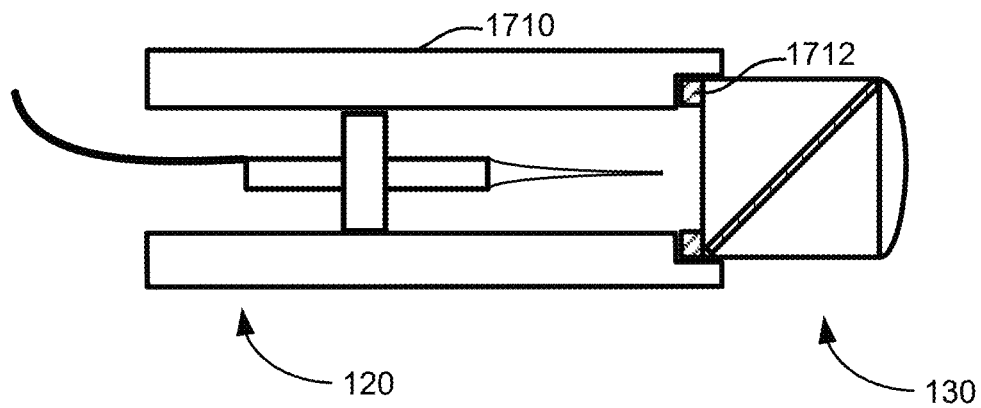
FIG. 17A is a simplified schematic diagram illustrating a fiber scanning projector within a vacuum enclosure according to an embodiment of the present invention.

FIGS. 17A-17F illustrate a fiber scanning projector within a vacuum enclosure according to one or more embodiments of the present invention. In reference to FIG. 17A, fiber scanning projector is illustrated with several components omitted to simplify description. As described in more detail in reference to FIG. 1, the fiber scanning projector illustrated in FIG. 17A operates by high frequency oscillation of the fiber tip. During operation, drag caused by gas in the region of the fiber tip may induce thermal effects and may impact operation of the fiber scanning projector. To that end, providing a vacuum enclosure within which drag is minimized or eliminated improves the operation and durability of the fiber scanning projector. As illustrated in FIG. 17A, a vacuum housing 1710 forms a seal with the optical assembly section 130 using a sealant 1712 (e.g., a gasketing material or an epoxy), such that the region around the chassis 120 is evacuated and held at a reduced pressure.

Figure 17B:
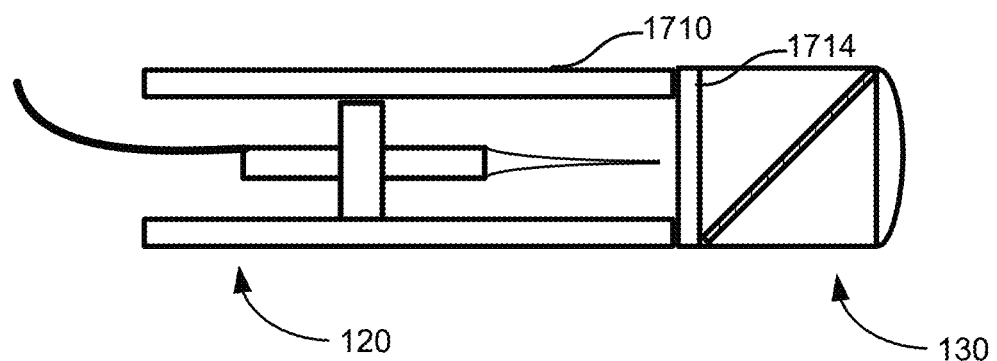
FIG. 17B is a simplified schematic diagram illustrating another fiber scanning projector within another vacuum enclosure according to an embodiment of the present invention.

In an embodiment, as illustrated in FIG. 17B, the vacuum enclosure 1710 is sealed using an optically transparent vacuum port 1714 including, for example, a flange or other bonding section and an optical transmission section (e.g., a window) through which display light and characterization light is transmitted to the optical assembly section 130.

Figure 17C:
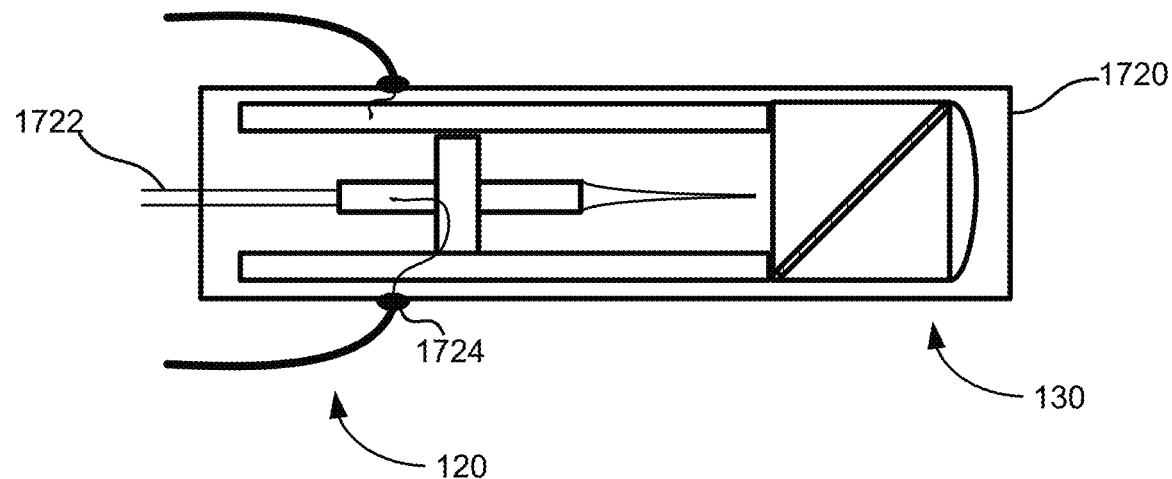
FIG. 17C is a simplified schematic diagram illustrating another fiber scanning projector within another vacuum enclosure according to an embodiment of the present invention.

In an embodiment, as illustrated in FIG. 17C, the chassis 120 and the optical assembly section 130 are enclosed in a vacuum assembly 1720, such that the entire fiber scanning projector is held at reduced pressure. Optical feedthroughs 1722 and electrical feedthroughs 1724 are included in vacuum assembly 1720 to conduct drive signals and display light/characterization light through the vacuum assembly 1720.

Figure 17D:
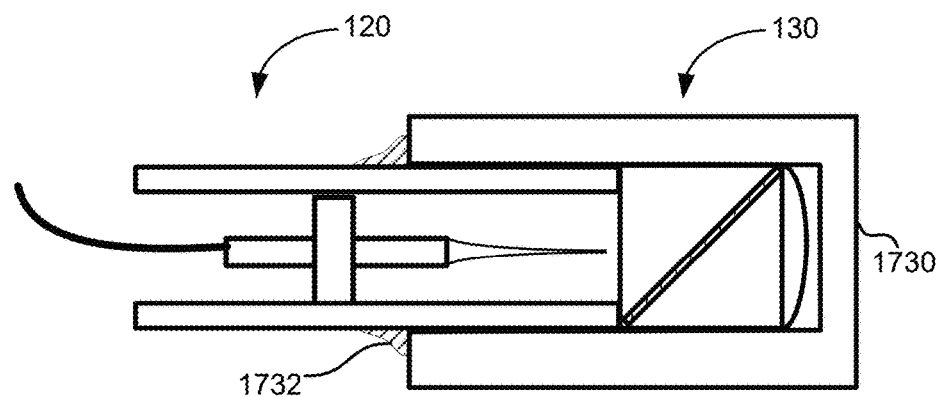
FIG. 17D is a simplified schematic diagram illustrating another fiber scanning projector within another vacuum enclosure according to an embodiment of the present invention.

As illustrated in FIG. 17D, a frontal vacuum enclosure 1730 forms a seal with the chassis 120 using sealant 1732, such that optical assembly section and the fiber scanning projector are held at reduced pressure.

Figure 17E:
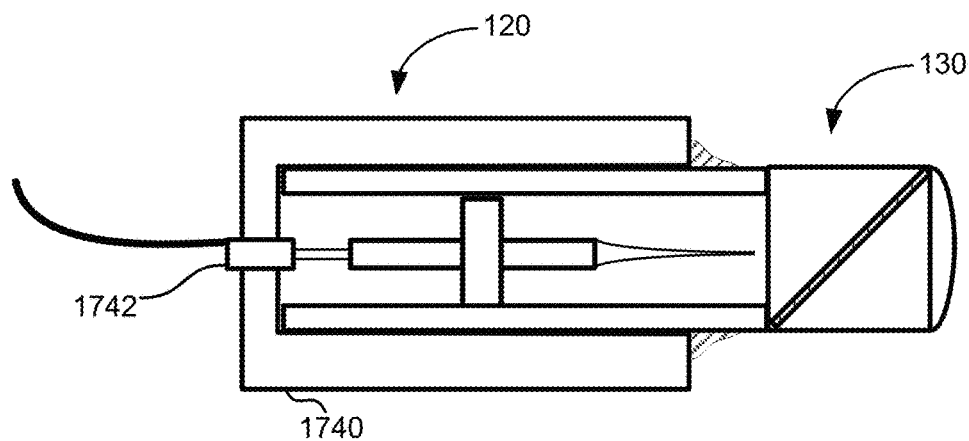
FIG. 17E is a simplified schematic diagram illustrating another fiber scanning projector within another vacuum enclosure according to an embodiment of the present invention.

As illustrated in FIG. 17E, a rearward vacuum enclosure 1730 forms a seal with the chassis 120, such that chassis and the fiber scanning projector are held at reduced pressure. Such an arrangement may include the optical window, as described in more detail in reference to FIG. 17B, to provide a vacuum tight seal over the fiber scanning projector.

Also shown in FIG. 17E, rearward vacuum enclosure includes one or more feedthroughs 1742 for electrical and/or optical signals. As illustrated in FIG. 17E, a vacuum enclosure is formed by joining a vacuum assembly 1750 to optical waveguide 1520 such that chassis 120 and optical assembly section 130 are both held at reduced pressure.

Figure 17F:
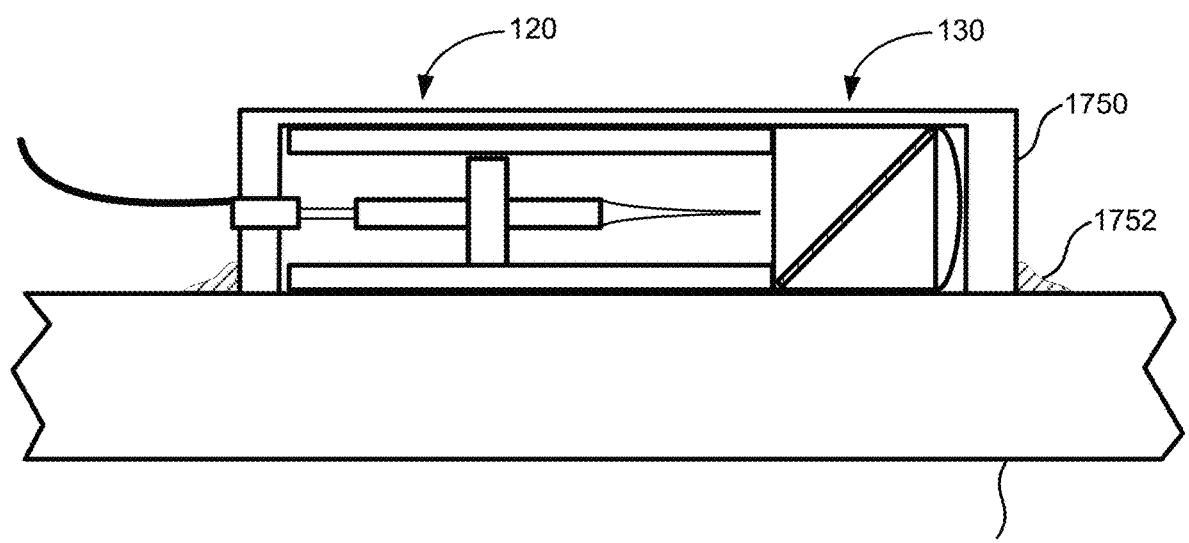
FIG. 17F is a simplified schematic diagram illustrating another fiber scanning projector within another vacuum enclosure according to an embodiment of the present invention.

In FIG. 17F, vacuum assembly 1750 is joined to optical waveguide 1520 using a sealant 1752, although joining could be effected by directly fusing vacuum assembly 1750 to optical waveguide 1520, for example, when both are constructed from the same material (e.g., glass or fused silica).

Figure 18:
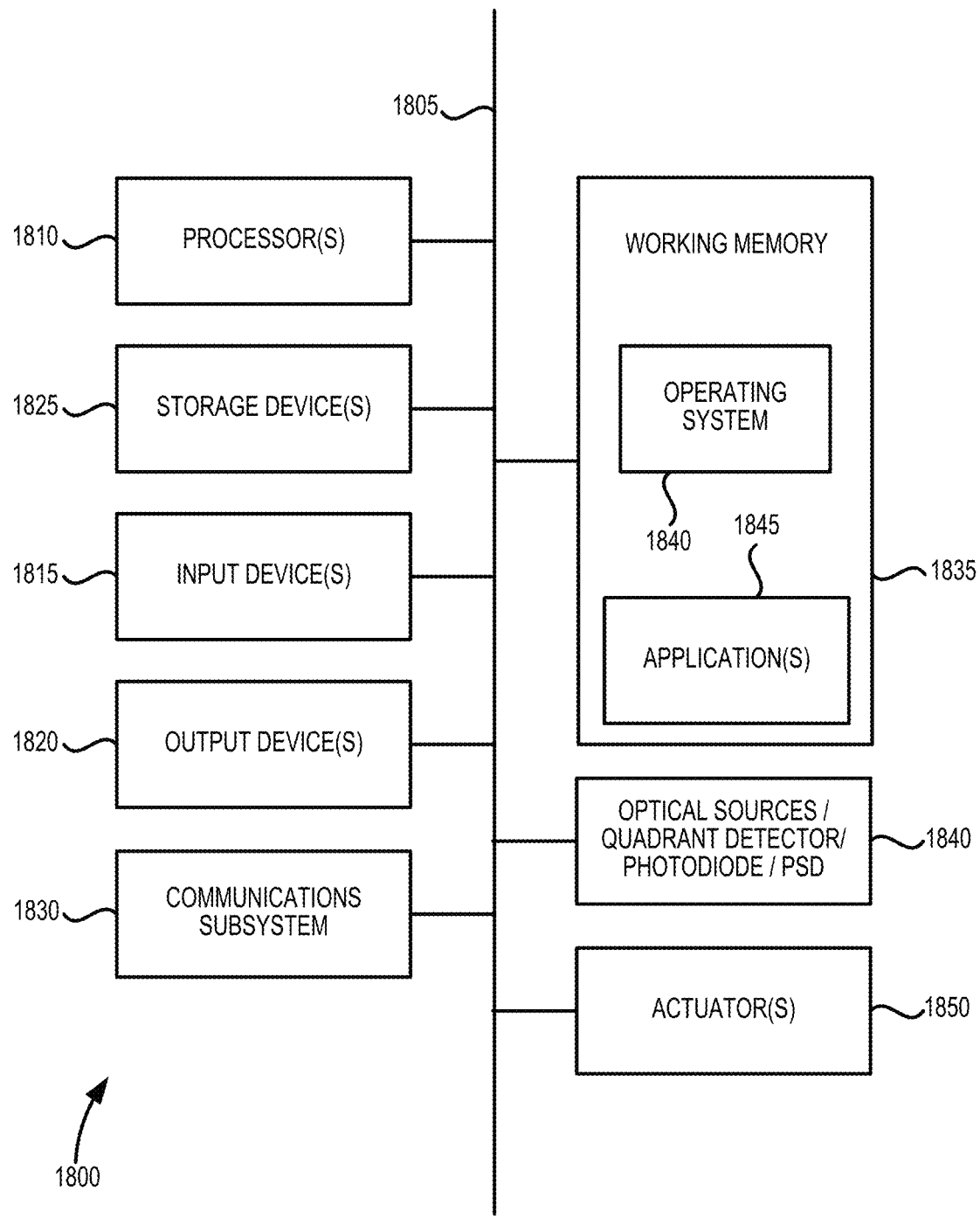
FIG. 18 is a simplified schematic diagram of a control system according to an embodiment of the present invention.

FIG. 18 is a simplified schematic diagram of a computer system according to an embodiment of the present invention. Computer system 1800, as illustrated in FIG. 18, which may also be referred to as a control system, may include one or more computing devices and may be incorporated into devices such as the cantilever scanning (e.g., fiber scanning) projectors described herein. FIG. 18 provides a schematic illustration of one embodiment of a computer system 1800 that can perform some or all of the steps of the methods provided by various embodiments. It should be noted that FIG. 18 is meant only to provide a generalized illustration of various components, any or all of which may be utilized as appropriate. FIG. 18, therefore, broadly illustrates how individual system elements may be implemented in a relatively separated or relatively more integrated manner.

Computer system 1800 can be utilized to drive actuator(s) 1850 and optical sources, as well as receive measured signals from quadrant detectors, photodiodes, PSDs 1840, and the like. For example, generation of a scanning pattern and subsequent of measured optical signals as illustrated in FIGS. 4, 5, 6, and 8 can be implemented using computer system 1800.

The computer system 1800 is shown comprising hardware elements that can be electrically coupled via a bus 1805, or may otherwise be in communication, as appropriate. The hardware elements may include one or more processors 1810, including, without limitation, one or more general-purpose processors and/or one or more special-purpose processors such as digital signal processing chips, graphics acceleration processors, and/or the like; one or more input devices 1815, which can include, without limitation, a mouse, a keyboard, a camera, and/or the like; and one or more output devices 1820, which can include, without limitation, a display device, a printer, and/or the like.

The computer system 1800 may further include and/or be in communication with one or more non-transitory storage devices 1825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including, without limitation, various file systems, database structures, and/or the like.

The computer system 1800 might also include a communications subsystem 1830, which can include, without limitation, a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1830 may include one or more input and/or output communication interfaces to permit data to be exchanged with a network, such as the network described below, to name one example, other computer systems, television, and/or any other devices described herein. Depending on the desired functionality and/or other implementation concerns, a portable electronic device or similar device may communicate images and/or other information via the communications subsystem 1830. In other embodiments, a portable electronic device, e.g., the first electronic device, may be incorporated into the computer system 1800, e.g., an electronic device as an input device 1815. In some embodiments, the computer system 1800 will further comprise a working memory 1835, which can include a RAM or ROM device, as described above.

The computer system 1800 also can include software elements, shown as being currently located within the working memory 1835, including an operating system 1840, device drivers, executable libraries, and/or other code, such as one or more application programs 1845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 18, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1825 described above. In some cases, the storage medium might be incorporated within a computer system, such as computer system 1800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1800 and/or might take the form of source and/or installable code, which, upon compilation and/or installation on the computer system 1800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software, including portable software, such as applets, etc., or both. Further, connection to other computing devices such as network input/output devices may be employed.

As mentioned above, in one aspect, some embodiments may employ a computer system, such as the computer system 1800, to perform methods in accordance with various embodiments of the technology. According to a set of embodiments, some or all of the procedures of such methods are performed by the computer system 1800 in response to processor 1810 executing one or more sequences of one or more instructions, which might be incorporated into the operating system 1840 and/or other code, such as an application program 1845, contained in the working memory 1835. Such instructions may be read into the working memory 1835 from another computer-readable medium, such as one or more of the storage device(s) 1825. Merely by way of example, execution of the sequences of instructions contained in the working memory 1835 might cause the processor(s) 1810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1800, various computer-readable media might be involved in providing instructions/code to processor(s) 1810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1825. Volatile media include, without limitation, dynamic memory, such as the working memory 1835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1800.

The communications subsystem 1830 and/or components thereof generally will receive signals, and the bus 1805 then might carry the signals and/or the data, instructions, etc., carried by the signals to the working memory 1835, from which the processor(s) 1810 retrieves and executes the instructions. The instructions received by the working memory 1835 may optionally be stored on a non-transitory storage device 1825 either before or after execution by the processor(s) 1810.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A projector including a cantilever position detection system, the projector comprising:
   a chassis;
   an actuator mounted to the chassis;
   a cantilever light source having a longitudinal axis and a tip, the cantilever light source being mechanically coupled to the actuator, wherein the cantilever light source is operable to propagate display light and characterization light and transmit the display light and the characterization light from the tip of the cantilever light source;
   an optical assembly section operable to receive the display light and the characterization light, wherein the optical assembly section comprises a dichroic mirror operable to reflect at least a portion of the display light and transmit at least a portion of the characterization light; and
   a position measurement device operable to receive the transmitted portion of the characterization light and measure a position of the tip of the cantilever light source, wherein the dichroic mirror is disposed between the cantilever light source and the position measurement device.

2. The projector of claim 1 wherein the cantilever light source comprises a scanning light source.

3. The projector of claim 2 wherein the scanning light source comprises a scanning waveguide source.

4. The projector of claim 3 wherein the actuator comprises a piezoelectric actuator and the cantilever light source comprises a scanning fiber mechanically coupled to the piezoelectric actuator and defining a convex object surface.

5. The projector of claim 4 wherein the scanning fiber comprises a first fiber and a second fiber joined at a bonding region, wherein the first fiber has a first cladding diameter and the second fiber has a second cladding diameter greater than the first cladding diameter, the projector further comprising one or more light sources operable to emit the characterization light to impinge on the bonding region.

6. The projector of claim 5 wherein a portion of the characterization light is coupled into and propagates in a cladding of the second fiber.

7. The projector of claim 3 wherein the scanning waveguide source comprises a microelectromechanical system (MEMS) element including a cantilevered waveguide.

8. The projector of claim 1 wherein the display light comprises visible wavelengths and the characterization light comprises infrared wavelengths.

9. The projector of claim 1 wherein the position measurement device comprises a quadrant detector disposed in a lateral plane orthogonal to the longitudinal axis.

10. The projector of claim 1 further comprising characterization optics disposed between the dichroic mirror and the position measurement device.

11. The projector of claim 1 wherein the position measurement device is operable to receive the transmitted portion of the characterization light.

12. A projector including a cantilever position detection system, the projector comprising:
    a chassis;
    an actuator mounted to the chassis;
    a position measurement device mounted to the chassis and including an aperture;
    a cantilever light source having a longitudinal axis and a tip, the cantilever light source being mechanically coupled to the actuator, wherein:
       the cantilever light source is operable to propagate display light and characterization light and transmit the display light and the characterization light from the tip of the cantilever light source; and
       the cantilever light source passes through the aperture; and
    an optical assembly section operable to receive the display light and the characterization light, wherein the optical assembly section comprises a dichroic polarizing beam splitter operable to transmit at least a portion of the characterization light independent of a polarization state of the characterization light, wherein the dichroic polarizing beam splitter is disposed between the cantilever light source and the position measurement device.

13. The projector of claim 12 wherein the cantilever light source comprises a scanning light source.

14. The projector of claim 13 wherein the scanning light source comprises a scanning waveguide source.

15. The projector of claim 14 wherein the actuator comprises a piezoelectric actuator and the cantilever light source comprises a scanning fiber mechanically coupled to the piezoelectric actuator and defining a convex object surface.

16. The projector of claim 15 wherein the scanning fiber comprises a first fiber and a second fiber joined at a bonding region, wherein the first fiber has a first cladding diameter and the second fiber has a second cladding diameter greater than the first cladding diameter, the projector further comprising one or more light sources operable to emit the characterization light to impinge on the bonding region, wherein a portion of the characterization light is coupled into and propagates in a cladding of the second fiber.

17. The projector of claim 14 wherein the scanning waveguide source comprises a microelectromechanical system (MEMS) element including a cantilevered waveguide.

18. The projector of claim 12 wherein the position measurement device comprises a quadrant detector disposed in a lateral plane orthogonal to the longitudinal axis.

19. The projector of claim 12 wherein the optical assembly section further comprising a collimating mirror.

20. The projector of claim 12 wherein the position measurement device is operable to receive the transmitted portion of the characterization light.

* * * * *